(12) United States Patent
Garvey et al.

(10) Patent No.: US 9,723,947 B2
(45) Date of Patent: Aug. 8, 2017

(54) HEATERS

(75) Inventors: Vincent Joseph Garvey, Colby (GB);
Colin Moughton, Port St. Mary (GB);
Yicai Zheng, Guangzhou (CN)

(73) Assignee: Strix Limited, Ronaldsway (IM)

( * ) Notice: Subject to any disclaimer, the term of this patent is extended or adjusted under 35 U.S.C. 154(b) by 35 days.

(21) Appl. No.: 13/321,437

(22) PCT Filed: May 20, 2010

(86) PCT No.: PCT/GB2010/001020
§ 371 (c)(1),
(2), (4) Date: Feb. 2, 2012

(87) PCT Pub. No.: WO2010/106349
PCT Pub. Date: Sep. 23, 2010

(65) Prior Publication Data
US 2012/0128338 A1 May 24, 2012

(30) Foreign Application Priority Data

May 20, 2009 (GB) .................................. 0908718.0
Dec. 21, 2009 (GB) .................................. 0922264.7

(51) Int. Cl.
| A47J 31/00 | (2006.01) |
| F24H 1/10 | (2006.01) |
| H05B 3/40 | (2006.01) |
| A47J 31/54 | (2006.01) |
| F24H 1/14 | (2006.01) |

(Continued)

(52) U.S. Cl.
CPC ............ *A47J 31/542* (2013.01); *F24H 1/102* (2013.01); *F24H 1/142* (2013.01); *F24H 9/0015* (2013.01); *F24H 9/1818* (2013.01); *F24H 9/2028* (2013.01); *H05B 3/44* (2013.01)

(58) Field of Classification Search
CPC ......... F24H 3/004; B67D 7/82; Y02B 30/108; H05B 3/82; A61H 33/063; B01D 1/0017; B01D 1/305; F22G 1/165
USPC ........... 392/465, 478–482, 485–490; 99/279, 99/281–283, 289 R
See application file for complete search history.

(56) References Cited

U.S. PATENT DOCUMENTS 1,406,850 A * 2/1922 Hadaway, Jr. ................ 392/309
1,965,218 A * 7/1934 Carr ........................ F24H 1/225
392/378

(Continued)

FOREIGN PATENT DOCUMENTS

| CN | 2461446 | 11/2001 |
| CN | 2563486 | 7/2003 |

(Continued)

OTHER PUBLICATIONS

"Kettlesense: A 'No Pour' Kettle", Alloy Total Product Design, 2001.

*Primary Examiner* — David Angwin
*Assistant Examiner* — Gyounghyun Bae
(74) *Attorney, Agent, or Firm* — O'Shea Getz P.C.

(57) ABSTRACT

A heater for heating liquid to boiling comprises a heating element (48; 106), a first heating region (18, 20; 100) heated by said heating element (48; 106) for heating liquid flowing therethrough to a temperature below boiling, and a second heating region (22; 102) for heating said liquid to boiling. The second region permits the exit of steam therefrom separately from heated water.

28 Claims, 16 Drawing Sheets

(51) Int. Cl.
*F24H 9/00* (2006.01)
*F24H 9/18* (2006.01)
*F24H 9/20* (2006.01)
*H05B 3/44* (2006.01)

(56) References Cited

U.S. PATENT DOCUMENTS

| | | | |
|---|---|---|---|
| 2,012,101 A * | 8/1935 | Hynes | 392/461 |
| 2,772,342 A * | 11/1956 | Reynolds et al. | 392/359 |
| 2,889,444 A * | 6/1959 | Stiebel | 392/485 |
| 2,976,392 A * | 3/1961 | Wabnitz | B05B 1/3046 |
| | | | 239/128 |
| 3,469,075 A * | 9/1969 | Barbier | 392/357 |
| 4,000,396 A | 12/1976 | Abel | |
| 4,193,755 A * | 3/1980 | Guarnaschelli et al. | 431/207 |
| 4,204,465 A * | 5/1980 | Knecht | A47J 31/30 |
| | | | 99/293 |
| 4,208,957 A | 6/1980 | Bollman et al. | |
| 4,287,817 A * | 9/1981 | Moskowitz | A47J 31/54 |
| | | | 392/403 |
| 4,354,094 A * | 10/1982 | Massey et al. | 392/451 |
| 4,380,973 A * | 4/1983 | Steinke | 123/145 A |
| 4,460,819 A * | 7/1984 | Eugster | 392/484 |
| 4,480,173 A * | 10/1984 | Butterfield | 392/401 |
| 4,565,121 A * | 1/1986 | Ohya et al. | 99/281 |
| 4,575,615 A * | 3/1986 | Shigenobu et al. | 392/450 |
| 4,602,145 A * | 7/1986 | Roberts | 392/496 |
| 4,650,964 A * | 3/1987 | Vincent | G01N 30/30 |
| | | | 219/390 |
| 4,786,782 A * | 11/1988 | Takai et al. | 392/492 |
| 4,818,845 A * | 4/1989 | Koizumi et al. | 392/462 |
| 4,823,767 A * | 4/1989 | Wust | 126/20 |
| 4,947,738 A * | 8/1990 | Eugster | A47J 31/46 |
| | | | 137/625.46 |
| 4,959,526 A * | 9/1990 | Kurachi et al. | 392/462 |
| 5,006,689 A * | 4/1991 | Kurachi et al. | 392/450 |
| 5,112,638 A * | 5/1992 | Cagley | A21D 2/366 |
| | | | 127/44 |
| 5,113,931 A * | 5/1992 | Oswalt et al. | 165/78 |
| 5,150,448 A * | 9/1992 | Salomon | 392/480 |
| 5,154,110 A * | 10/1992 | Chang | A47J 31/30 |
| | | | 99/281 |
| 5,309,821 A | 5/1994 | Knepler | |
| 5,367,607 A * | 11/1994 | Hufnagl et al. | 392/465 |
| 5,388,502 A * | 2/1995 | Hufnagl | A47J 31/3671 |
| | | | 99/295 |
| 5,397,031 A | 3/1995 | Jensen | |
| 5,408,578 A * | 4/1995 | Bolivar | F24H 1/102 |
| | | | 219/481 |
| 5,408,917 A * | 4/1995 | Lussi | A47J 31/007 |
| | | | 219/428 |
| 5,438,642 A * | 8/1995 | Posen | F24H 1/102 |
| | | | 122/19.1 |
| 5,549,036 A * | 8/1996 | Hourizadeh | 99/286 |
| 5,551,331 A | 9/1996 | Pfiefer et al. | |
| 5,647,055 A | 7/1997 | Knepler | |
| 5,671,325 A | 9/1997 | Roberson | |
| 5,778,765 A * | 7/1998 | Klawuhn et al. | 99/290 |
| 5,797,313 A | 8/1998 | Rothley | |
| 5,842,407 A * | 12/1998 | Schmed | A47J 31/54 |
| | | | 99/290 |
| 5,943,472 A | 8/1999 | Charles et al. | |
| 6,019,028 A * | 2/2000 | Schmed | A47J 31/0573 |
| | | | 99/290 |
| 6,058,926 A | 5/2000 | Ruiz | |
| 6,118,933 A | 9/2000 | Roberson | |
| 6,311,868 B1 * | 11/2001 | Krietemeier | A45D 34/00 |
| | | | 222/1 |
| 6,371,359 B1 * | 4/2002 | Kimura et al. | 228/175 |
| 6,389,226 B1 * | 5/2002 | Neale | F24H 1/102 |
| | | | 392/485 |
| 6,553,948 B1 | 4/2003 | Luo | |
| 6,659,048 B1 * | 12/2003 | DeSantis | F24H 1/18 |
| | | | 122/13.3 |
| 7,190,890 B2 * | 3/2007 | Higham et al. | 392/473 |
| 7,281,467 B2 * | 10/2007 | Cai | A47J 31/30 |
| | | | 99/293 |
| 7,801,424 B2 * | 9/2010 | Cheung | 392/399 |
| 7,813,628 B2 * | 10/2010 | Haan | 392/441 |
| 2002/0051632 A1 | 5/2002 | Kodden et al. | |
| 2003/0066430 A1 * | 4/2003 | Bitar | A47J 31/36 |
| | | | 99/275 |
| 2003/0066431 A1 * | 4/2003 | Fanzutti | A47J 31/36 |
| | | | 99/279 |
| 2004/0057709 A1 | 3/2004 | Leary et al. | |
| 2004/0226452 A1 | 11/2004 | Lyall | |
| 2005/0279215 A1 * | 12/2005 | Cai | A47J 31/30 |
| | | | 99/279 |
| 2006/0027103 A1 | 2/2006 | Boussemart et al. | |
| 2007/0017243 A1 * | 1/2007 | Kidwell | C10L 3/10 |
| | | | 62/260 |
| 2007/0086758 A1 | 4/2007 | Rossi et al. | |
| 2007/0147808 A1 * | 6/2007 | Egeresi | 392/485 |
| 2007/0183758 A1 * | 8/2007 | Bradenbaugh | 392/478 |
| 2007/0295216 A1 * | 12/2007 | Williamson et al. | 99/275 |
| 2008/0037968 A1 | 2/2008 | Kaastra | |
| 2008/0041233 A1 * | 2/2008 | Bunn | A47J 31/007 |
| | | | 99/281 |
| 2008/0226779 A1 * | 9/2008 | Cocchi et al. | 426/231 |
| 2008/0247740 A1 * | 10/2008 | Rijskamp | A47J 31/54 |
| | | | 392/451 |
| 2008/0285964 A1 * | 11/2008 | Sullivan | F24H 1/142 |
| | | | 392/485 |
| 2009/0038481 A1 * | 2/2009 | Yamamoto et al. | 99/330 |
| 2009/0092384 A1 * | 4/2009 | Luo | H05B 6/108 |
| | | | 392/488 |
| 2009/0290858 A1 * | 11/2009 | Altman et al. | 392/485 |
| 2010/0193492 A1 | 8/2010 | Hughes | |
| 2011/0033176 A1 | 2/2011 | Garvey et al. | |
| 2011/0058798 A1 | 3/2011 | Garvey et al. | |

FOREIGN PATENT DOCUMENTS

| | | |
|---|---|---|
| CN | 101093102 A | 12/2007 |
| CN | 101564271 | 10/2009 |
| CN | 201387123 | 1/2010 |
| DE | 2846339 | 5/1980 |
| DE | 3521989 | 1/1987 |
| DE | 102006037569 | 2/2008 |
| EP | 0084069 | 8/1985 |
| EP | 0881859 | 10/2002 |
| FR | 2259325 | 1/1978 |
| GB | 373801 | 6/1932 |
| GB | 938195 | 10/1963 |
| GB | 944651 | 12/1963 |
| GB | 1359143 | 7/1974 |
| GB | 1454772 | 11/1976 |
| GB | 2162027 | 1/1986 |
| GB | 2340590 | 2/2000 |
| GB | 2452981 | 3/2009 |
| JP | H10309895 A | 11/1998 |
| JP | 200497386 | 2/2004 |
| JP | 2007020711 A | 2/2007 |
| JP | 2009142648 | 7/2009 |
| JP | 2009160286 | 7/2009 |
| JP | 2009247835 | 10/2009 |
| NO | WO2014205679 A1 | 12/2014 |
| WO | 2008139205 | 11/2008 |

* cited by examiner

HEATERS

This application is entitled to the benefit of, and incorporates by reference essential subject matter disclosed in PCT Application No. PCT/GB2010/001020 filed on May 20, 2010, which claims priority to Great Britain Application No. 0908718.0 filed May 20, 2009 and Great Britain Application No. 0922264.7 filed Dec. 21, 2009. This application is related to U.S. patent application Ser. No. 13/518,290 filed Dec. 4, 2012.

BACKGROUND OF THE INVENTION

1. Technical Field

This invention relates to heaters for heating, particularly to boiling liquids, e.g. water.

2. Background Information

A number of methods are known to provide hot or boiling water for domestic consumption. Traditionally electric kettles or jugs are used to boil a quantity of water e.g. for making hot beverages.

More recently products have been marketed which promise to deliver small quantities of hot water very quickly. Rather than heat a body of water uniformly, these are based on flow-heaters which heat water as it passes through a narrow passage with a thick film printed element on one side. However such technology has significant drawbacks, the most important of which is that they cannot be used to boil water as is explained below.

During boiling of water in a conventional kettle, the bulk of the water is at substantially the same temperature which gradually rises as heating progresses. Only the boundary layer close to the heated surface is significantly hotter. Heat is transferred from the heated surface to the boundary layer by conduction and initially at least, from the boundary layer to the bulk by convection. In heaters with a high surface temperature, the water in the boundary layer can reach 100° C. and boil while the bulk water is relatively cool. The bubbles of steam initially condense and collapse due to contact with the cooler bulk water.

As heating continues, bubbles of steam, being lighter than the surrounding water rise from the heater surface. As the bubbles rise they conduct heat to the cooler surrounding water and the resultant condensation eventually causes the bubble to collapse. However as the bulk of the water approaches boiling temperature, it no longer causes full condensation of the rising bubbles, and these rise to the surface and break free which is generally considered to indicate that the water is boiling. In practice the bulk water temperature will not quite be at 100° C. at this stage. Conventionally, domestic jugs and kettles will maintain a "rolling boil" for several seconds which enables the bulk water liquid to uniformly reach a temperature very close to 100° C., although it never quite gets there and moreover the actual boiling point is dependent on other factors such as atmospheric pressure and the presence of dissolved substances in the water.

A flow heater, by comparison, has the benefit of being able to heat water on demand and to be operated only for as long as necessary to deliver the required quantity of water. However consumers expect a start-up time that appears virtually instantaneous—certainly no longer than a few seconds. In the context of small domestic products the amount of power is fixed by that available from the wall outlet socket (1500 W to 3000 W typically) and cannot be increased. Under steady state conditions, the flow-rate of water will be matched to the heater output power according to the basic laws of thermodynamics (for a 3 kW heater, a flow-rate of around 0.5 liters/minute up to 1 liter/minute will provide water with a temperature range from near boiling down to about 65° C.). The heater type, and heat exchange mechanism have little influence.

When designing a flow heater with very fast start-up it is important to minimize the thermal mass of the heater itself and the temperature to which it needs to be heated. It is also important to maximize the contact area between the water and the heater. These requirements have been addressed in the recent prior art by the use of a thick film heater bonded via an intermediate electrical insulation layer to a stainless steel heat exchanger. The heat exchanger is designed with a complex chamber facing the heater to maximize the contact area. However the Applicant has realized that care must be taken over the distribution of water flow over the heater surface. If any section of water in contact with the surface is allowed to stagnate, it will quickly boil, creating a pocket of steam. A pocket of steam will no longer provide cooling to the element surface. The effect of this is rapid localized heating of the surface, and a failure, usually of the insulation between the heater track and heater substrate surface. To avoid this, the water is therefore constrained to flow in a tortuous narrow channel to avoid stagnant spots.

The Applicant has also appreciated that another problem arises with the use of a narrow water channel. As the water approaches the end of the heater, it will be at its hottest—typically 85° C. The water channel, although small, nevertheless still consists of a boundary layer and a bulk water channel; the water in the boundary layer will often boil, creating bubbles of steam. In this configuration, a bubble of steam, emerging into the very small channel is unable to transfer heat by conduction and condensation, as it cannot expose its surface area to surrounding water, instead, the expanding bubble will simply push the remaining water ahead of it. It can be seen, that if this bubble occurs, for example 80% of the way along the channel, it will in fact cause all of the water in the last 20% of the channel to be ejected violently. In addition to the undesirable effect of "spitting" from the users perspective, the depletion of water cover at the end sections of the heater can often lead to premature element failure. Despite the appearance to the user, the majority of the water ejected will be significantly below boiling.

The problems of localized hot spots and spitting means that flow heaters can't be used to provide boiling water. In fact the hotter the water temperature aimed for, the greater these problems are. In practice therefore, flow heaters have been restricted to applications requiring water at temperatures below boiling such as shower heaters, and hot water dispensers that do not boil water.

SUMMARY OF THE DISCLOSURE

When viewed from a first aspect the present invention provides a heater for heating liquid to boiling comprising a heating element, a first heating region heated by said heating element for heating liquid flowing therethrough to a temperature below boiling, and a second heating region for heating said liquid to boiling, said second region having means for permitting the exit of steam therefrom separately from heated water.

When viewed from a second aspect the invention provides a flow heater comprising a heated flow conduit for heating liquid therein to a temperature below boiling and a final heating chamber for heating said liquid to boiling wherein said heating chamber comprises a space above the liquid surface for allowing the escape of steam from the liquid surface.

Thus it will be seen by those skilled in the art that in accordance with the invention a standard flow heater can be modified by the provision of a second heating region or final heating chamber which allows steam to escape from the surface of the water without forcing the heated water out— i.e. the phenomenon of spitting is reduced or avoided. Moreover the facility for steam to escape allows the surface of the heater to remain flooded in water and so avoid localized hot spots. A standard flow heater can be thought of as one in which there exists in use a temperature gradient along the direction of flow. Whilst the invention allows boiling water to be produced in its preferred embodiments, only the water in the second region boils; it is not necessary to heat the whole of the contents of the heater to boiling before boiling water can be produced as would be the case with a kettle or other 'batch' heater. For example a cold water temperature of 20° C. preheated to 90° C. in the first region will have an average temperature of only 55° C.

In accordance with the invention the second heating region or final heating chamber continues to heat the water from the temperature at which it leaves the first region (e.g. the first region resembling a traditional flow heater), to boiling. A separate heater could be provided for this purpose. In a set of preferred embodiments however a single heater is provided which extends into the second heating region or final heating chamber.

Hereinafter reference will only be made to the first heating region and second heating region respectively. However, these references should be understood to apply equally to the heated flow conduit and the final heating chamber respectively recited in accordance with the second aspect of the invention. The omission of these latter two terms is simply for reasons of brevity and no other conclusion should be drawn.

The form of the transition between the first and second heating regions is not considered essential to the invention and several possibilities are envisaged. For example, the first heating region could gradually open out at its downstream end to form the second heating region. In such a case the point of transition between the first and second heating regions could be defined relatively arbitrarily. For example, the transition could be defined in terms of the dimensions of the channel through which the liquid being heated flows such as the point at which the cross section of this channel begins to expand, or when it has fully expanded or at midway point. Alternatively, a definition in terms of the linear flow speed could be envisaged, e.g. where the linear flow speed is reduced to half the speed in the first region. Functionally the transition occurs when bubbles of steam can escape from a surface of the liquid without displacing the remaining liquid.

In the first region, the controlled parameter is the water velocity (achieving a balance between good heat transfer with high velocity and acceptable hydraulic pressure drop) and in the second region the controlled parameter is water level, achieving a balance between heat transfer, by ensuring the heater is covered, and minimizing water volume by ensuring the water level is as low as possible. Minimizing water volume in the first and second regions maintains the fastest start-up time.

In accordance with the second aspect of the invention the heated flow conduit could be heated in a number of ways. In one set of embodiments it is provided with an electric heating element for heating the liquid therein as in accordance with the first aspect of the invention. However this is not essential. It could alternatively for example be provided by one side of a heat exchanger, through the other side of which a hotter liquid or gas is passed.

The heating element for the first region, or the heated flow conduit where this is provided with a heating element, could take any convenient form. In one set of embodiments, the heating element is provided on the outside of a channel or conduit forming the first heating region. The element could take the form of a so-called thick film printed element. Such elements are conventionally planar, but can also be produced with non-planar substrates. Alternatively it could comprise a sheathed resistance heating element, with or without an intermediate metallic heat diffuser plate as is commonly found in so-called underfloor heaters for domestic kettles. The advantages of having an element on the outside of the channel are that it is relatively easy to manufacture and it allows overheat protection to be provided in close thermal contact with the element to switch off the element in the event of it being energized without water in the channel.

In another set of embodiments an immersion element is provided within a channel or conduit forming the first heating region. Accordingly, in preferred embodiments the first heating region comprises a channel for conveying liquid having a sheathed heating element disposed therein for heating the liquid. The element could be mounted to or in contact with a wall of the channel, although in a set of preferred embodiments it is disposed within the channel so that liquid is in contact with it all the way around its periphery. In a set of preferred embodiments, the first heating region comprises a preferably tubular jacket around the heating element such that liquid can flow between the element and the jacket. This is beneficial in giving a large surface contact area between the liquid and the heater surface, and also helps to minimize the tendency for spitting should any bubbles be formed since a single bubble cannot occupy the entire cross-section of the channel. Under normal operation, i.e. with bulk water temperature not exceeding 85 or 90° C., then a bubble forming will result in a higher water velocity in the remaining stream, improving heat transfer, and minimizing the likelihood of the bubble growing circumferentially.

The jacket could conform in profile to the heating element (e.g. be of circular cross section if the heating element is of circular cross section) but this is not essential; it could be in the form of a block having a channel defined therein to accommodate the element and the liquid around it.

Any suitable material could be used for the jacket. In one set of preferred embodiments, the jacket comprises stainless steel. This gives the overall heater robustness and in particular ensures that it is tolerant to overheating, for example by being operated without being in contact with liquid. The jacket should ideally have a low thermal mass and in the case of a stainless steel jacket this means that in preferred embodiments it should be relatively thin. Where a stainless steel or other metallic jacket is provided, it is preferably less than 0.7 mm thick, more preferably approximately 0.5-0.6 mm thick. The applicant has discovered, contrary to the prevailing wisdom in the art, that in fact a standard sheathed immersed element (e.g. of 6.6 mm diameter operating at 35 W/cm2) with a thin stainless steel jacket as outlined above in fact has a lower thermal mass than a typical corresponding thick film heating element arrangement.

Such arrangements are considered to be novel and inventive in their own right and thus when viewed from a further aspect the invention provides a flow heater comprising a channel conveying liquid and a sheathed heating element disposed in the channel such that the surface of the heating element is at least partly surrounded by liquid in use.

Preferably the surface of the heating element is surrounded by liquid all the way round; thus the flow heater in accordance with the aforementioned aspect preferably comprises a jacket as outlined above.

Preferably, in any foregoing aspect of the invention, the heating element has a circular cross-section. Preferably the channel or jacket (or at least the inner wall thereof) has a circular cross-section. Where the heating element cross-section is non-circular, the cross-section of the jacket or channel (or at least the inner wall thereof) is preferably the same shape.

Where in the foregoing the heating element is surrounded with liquid all round, the end mounting of the element and outer tube can maintain a concentric relationship between the tubes, however, it is has been found advantageous in some embodiments to provide spacing means between the element and the channel or jacket to help ensure that the correct spacing is maintained between them. The spacing means could be provided by a separate, suitably heat-resistant, coaxial insert. More conveniently however it is provided by suitable features formed on one or both of the element or jacket.

In one convenient set of embodiments for example the jacket could be indented when viewed from the outside to form protrusions which contact the element to maintain the spacing between the element and the rest of the jacket whilst still permitting liquid flow over the majority of the surface of the element. The protrusions could be discrete in a longitudinal direction but equally could be in the form of continuous longitudinal ribs, effectively forming a plurality of discrete channels distributed around the circumference of the element. Of course the protrusions could be on the element as well as or instead of on the jacket.

It is important to be able to exercise suitable control over the operation of flow heaters in accordance with the invention. One aspect of this is preventing serious overheating of the heater when it is accidentally operated without liquid. There are of course a number of ways in which this could be done. In a particularly convenient embodiment, a sheathed immersed heating element is employed, part of which is bonded to a metal "head" plate to form a hot return in exactly the same way as is well known for traditional immersed kettle elements. The advantage of this is that it then allows a conventional control for immersed elements, such as the applicant's extremely popular and successful R7 series of controls, to be used for giving both primary and secondary overheat protection for the element. Details of such controls are given in GB-A-2181598. Further preferably, such a control is also used to provide electrical contact to the element either directly or indirectly.

Advantageously the overheat protection is provided in the second region in which water can boil. This addresses a fundamental problem with providing dry-switch-on overheat protection in a flow heater comprising a sheathed heating element disposed in a channel and surrounded by liquid; the presence of the channel physically prevents placing a sensor in good thermal contact with the element.

Such arrangements are novel and inventive in their own right and thus when viewed from a further aspect the invention provides a flow heater comprising a first region with a sheathed heating element provided in a channel so as to be surrounded by liquid all the way round, said element extending into a second region in which said liquid is allowed to boil, the heater further comprising a thermal sensor in good thermal contact with said element in said second region for detecting overheating of said element.

The thermal sensor could, for example, be a thermistor, thermocouple or other electronic sensor or could be a thermo-mechanical sensor such as a shape-memory metal actuator or a bimetallic actuator. It could be in direct physical contact but preferably the good thermal contact is achieved via a thermally conductive wall of the second region—e.g. the traditional head and hot return arrangement described above.

Preferably the part of the element which is in good thermal contact with the thermal sensor is higher than the rest of the heated part of the element.

Additionally or alternatively, it may be desirable to measure the temperature of the liquid in or exiting from the heater. This could, for example, assist in overheat detection or it could be used as part of a feedback control system to control the flow-rate of water passing through the heater. When boiling water is required it is advantageous to be able to exercise control over the flow rate since the optimum flow rate is determined by the precise power of the heater, the performance of any pump provided, the supply voltage and the incoming ambient water temperature. The first two of these factors are subject to manufacturing tolerances whilst the latter two can vary during use.

Moreover, although the invention advantageously allows the supply of boiling water from a flow heater, it may be desirable in some circumstances to supply water at a lower temperature or to allow the user to vary the temperature. Indeed, in one set of preferred embodiments, means are provided for controlling the temperature of liquid supplied by the heater.

The Applicant has appreciated that the output temperature of the liquid is a function both of the power of the heater and of the flow rate. Accordingly, either of these two parameters could be varied. In a set of embodiments, the means for controlling the temperature comprises means for altering the flow rate of liquid through the heater. For example, for a typical 3 kilowatt heating element, the Applicant has discovered that water can be supplied at approximately 100° C. (assuming it starts at approximately 17° C.) if the flow rate through the heater is approximately 520 ml per minute. If the flow rate is reduced further to approximately 475 mL/min, extra energy is put into the water to counter the loss of energy through steam which escapes without conducting heat to the surrounding water. The result is a so-called rolling boil in which the bulk of the water is ensured to be at its nominal boiling temperature (typically 100° C.). Alternatively if the flow rate is increased to 900 ml per minute, the water is supplied at a temperature of approximately 65° C.

The initiation of liquid flow (e.g. through activation of a pump or opening of a valve) could take place as soon as the heating element is energised. However in preferred embodiments the heater is arranged to initiate water flow after a delay interval relative to energization of the heating element. The Applicant has appreciated that by introducing a deliberate delay it can be ensured that substantially all of the liquid is dispensed at the desired temperature—i.e. there is no initial slug of cooler liquid at the beginning of the dispense operation. The delay could be fixed but is preferably determined as a function of the temperature of the liquid sitting in the heater so that if the liquid in the heater is warm, the delay is reduced, potentially down to zero (no delay) or even negative—i.e. the pump may be started before the heater if, for example, the system is being restarted after a short 'off' time and a lower desired temperature has been chosen.

Similarly the flow could be switched off simultaneously with the heating element, but in a set of preferred embodiments the heating element is switched off before the flow is stopped. This allows the heat stored in the element and other components to be partly recovered to heat water. This is not only more energy efficient, but means that the heater can be used more quickly thereafter to dispense cooler liquid.

The length of time for which liquid is dispensed could be fixed or indefinite—e.g. for as long as a user holds down a button. In a set of preferred embodiments liquid is dispensed for a time preset by a user. The time could be set directly, but preferably it is set by means of a dispensed volume control, in which case the dispense time will also be a function of the flow rate, which might in turn be a function of the dispense temperature as explained above. Having the liquid being dispensed for a predetermined time is beneficial in allowing the heating element to be turned down or off towards the end of the dispense operation to recover stored heat as outlined above.

The Applicant has appreciated that where the supply of liquid may be at or near boiling, it is very difficult to measure its temperature accurately since the liquid in the second region will be moving turbulently and will contain many bubbles of steam, so that any point temperature sensor such as a thermistor tends to give inaccurate and wildly fluctuating results. However, the applicant has devised an arrangement which allows much more accurate and stable determination of the output temperature of the liquid.

According to preferred embodiments of the invention, temperature sensing means are provided in the first heating region for determining the output temperature of a liquid. Thus, in accordance with these embodiments a temperature measurement of the liquid is made upstream of where it is finally dispensed, rather than measuring the actual output temperature of the liquid. This stems from the applicant's realization that there is a strong correlation between the temperature of the liquid at a known point in the first heating region and the output temperature. Given that both the liquid capacity and the heating power of the heating element downstream of the measuring point are known, the output temperature can be calculated. The advantage of measuring the temperature in the first region is that since the liquid is not, or substantially is not, boiling in that region a much more accurate temperature measurement can be made.

Accurate knowledge of the temperature of the water in the second region (e.g. obtained through measuring temperature in the first region) is beneficial in allowing control of the apparatus in a number of ways. Firstly of course it allows the output temperature of the water to be varied. However, it also allows account to be taken of non-equilibrium situations arising from previous operations of the apparatus. For example, if the apparatus is being used to dispense boiling water and a subsequent demand for cooler water is made by a user, the flow of liquid may be commenced earlier relative to energization of the heater, or it may even not be necessary to energize the heater at all depending on how much the liquid has cooled.

Where temperature is measured in the first region the Applicant has realized that it is desirable in some circumstances to encourage a swirling flow component about the longitudinal axis of the channel or conduit since this ensures a more reliable single-point temperature measurement. Being able to measure temperature is preferable to requiring multiple sensors on cost grounds. In one set of embodiments the channel or conduit comprising the first region comprises an inlet arranged so as to introduce liquid thereto along a direction offset from the central axis of the channel or conduit in order to give the desired swirling which promotes mixing of the liquid inside the channel and hence a more even temperature distribution. For example the inlet could be arranged to introduce the liquid with a tangential component of flow.

In another, not mutually exclusive, set of embodiments the channel or conduit in the first region is configured to promote a swirling flow. There are many possible ways in which this could be achieved. In a subset of such embodiments the internal surface of one or more of walls of the channel is/are provided with helical features. For example the surface could be provided with ribs, grooves, or any other patterns of protrusions or depressions which encourages swirling flow. The features could extend either part-way or all the way around the perimeter of the internal surface and could extend all or part-way along the length of the channel. The features need not be continuous; they could comprise a series of bumps or other protrusions.

Where the channel is provided with an immersed element inside the channel, the helical features could be provided additionally or instead on the outer surface of the element. Another alternative, again not mutually exclusive with the options given above, is for an independent flow shaping element to be introduced into the channel. In a particularly convenient set of embodiments such a flow shaping element comprises a wire wrapped around a sheathed heating element immersed in the channel. This is not only economical to produce but is also relatively straightforward to assemble. A similar alternative might comprise a resilient coil wrapped around the element while it is inserted during manufacture and subsequently released so as to expand against the inner surface of the channel wall. In either case the thickness of the wire is preferably less than the width of the gap between the element surface and the channel wall; in other words the wire does not define separate individual helical channels but rather it simply encourages a swirling flow by causing a swirling motion of the boundary layer of liquid. In some embodiments the thickness of the wire is less than a third of the width of the gap.

In accordance with all aspects of the invention, the liquid flow could be driven by hydrostatic pressure achieved by arranging a reservoir of liquid above the outlet and using a valve or tap. Preferably, however, a pump is provided for driving liquid through the flow heater. Any suitable pump could be used, but in a set of preferred embodiments the pump comprises a centrifugal pump. These are smaller and quieter than the reciprocating pumps used in some known devices. It is believed that reciprocating pumps, which are typically driven by an AC supply derived from the mains, have been used previously due to their relative tolerance to fluctuations in pressure drop across them; that is the output flow rate remains substantially constant over a wide range of pressures. By contrast for centrifugal pumps the flow rate is strongly dependent on the pressure drop. This is a problem in applications such as stand-alone hot water dispensers which are fed by a static reservoir since the inlet pressure, and so the output flow rate, will depend on the level of water in the reservoir. This problem can be addressed by a form of feedback control for adjusting the speed of the pump. However the Applicant has devised a further arrangement which is particularly applicable to appliances having a water reservoir, as is preferred.

Thus according to a set of preferred embodiments there is provided an appliance comprising a heater of the kind described, a pump for supplying liquid to the heater and a reservoir for storing liquid, the appliance further comprising an intermediate holding chamber between the reservoir and the pump, and means for filling the holding chamber from the reservoir to a predetermined level.

In accordance with such embodiments the pump does not draw liquid water directly from the reservoir but rather from the intermediate holding chamber. Since it is filled to a predetermined level, the pressure head at the pump inlet will be known and can therefore be factored into the calculations of pump speed, flow rate etc. Even though the level of water in the intermediate holding chamber may reduce during dispensing, the variation in pressure is over a smaller range.

Another advantage of this arrangement is that it means that liquid can be drawn by the pump at a faster rate than it might be desirable for liquid to exit the reservoir. This is particularly relevant where a water filter cartridge is employed at the exit from the reservoir since these are often most effective when the flow rate through them is deliberately choked—e.g. as in the Applicant's Aqua Optima® filters. For example the typical flow rate trough an Aqua Optima filter is approximately 400 mL/min whereas, as discussed above, in some circumstances a flow rate of up to 900 mL/min may be desirable.

Such arrangements are considered to be novel and inventive in their own right and thus when viewed from a further aspect the invention provides an appliance for providing heated liquid comprising a flow heater, a pump for supplying liquid to the heater and a reservoir for storing liquid, wherein the appliance further comprises an intermediate holding chamber between the reservoir and the pump, said intermediate holding chamber being arranged such that it is filled from the reservoir to a predetermined level.

Preferably the reservoir is higher than the intermediate holding chamber and so fills it under gravity. Preferably the intermediate holding chamber has a smaller capacity than the reservoir.

In some embodiments the predetermined level could be full—i.e. the intermediate holding chamber is simply filled to capacity. In other embodiments the predetermined level corresponds to the intermediate holding chamber being only partially filled. Several ways of partially filling the intermediate holding chamber only to a predetermined level can be envisaged including electronic level sensors or a float valve. In a set of preferred embodiments the means for filling the intermediate holding chamber comprises a ventilation tube communicating with an enclosed air space above the liquid in the reservoir and extending down to the predetermined level in the holding chamber, with the reservoir being sealed against the escape of air above the liquid therein except by means of the ventilation tube. By such an arrangement the holding chamber will be filled, displacing air through the ventilation tube, until the liquid level reaches the bottom of the ventilation tube. At that point, no more air can enter the intermediate holding chamber, creating a partial vacuum in the reservoir that prevents further liquid flowing out of it into the intermediate holding chamber.

Although thus far the invention has been described in terms of flow heaters, the Applicant has further recognized that the second region which can be used to boil liquid could also be beneficial as an addition to other forms of heater which produce liquid at a temperature below boiling. Thus when viewed from a further aspect the invention provides apparatus for heating a liquid comprising a first heating region for heating liquid therein to a temperature below boiling and a final heating chamber for heating said liquid to boiling wherein said heating chamber comprises a space above the liquid surface for allowing the escape of steam from the liquid surface.

There are many possible arrangements for dispensing the heated liquid from the second region in accordance with the invention. One possibility would be a simple valve or tap for allowing water to drain out of the second region/boiling chamber. The problem with such an arrangement is that the outflow through such a valve or tap would have to be precisely coordinated with the inflow from the pump. For example, if the outflow rate is even slightly greater than the inlet flow rate, (or if it commences to flow out too early) the heater will run dry. If the outflow rate is slightly lower, then the outflow chamber will overflow, or, as the water level increases, the effect of boiling in the chamber will result in water spitting. This will occur because, as the steam bubbles generated at the surface now must travel through a vertical body of water, they will entrain droplets of water and carry them at high velocity to the surface. The pump inflow, as discussed can start and stop at irregular times, and, is constantly varying in response to all the input variables—desired outlet temperature, inlet water temperature, voltage fluctuations, and the natural oscillations that can occur in any closed loop control system. The difficulty in controlling the outflow is further exacerbated by the need, on start-up, to prevent outflow until such time as sufficient water has entered to fill the system to its intended working level.

In a set of preferred embodiments therefore means are provided to permit automatic outflow of liquid upon the liquid reaching a predetermined level. This ensures that a certain amount of liquid is retained and can therefore ensure that a heater surface is covered sufficiently to prevent it overheating. Such a function could be achieved electronically or through use of a float but preferably a weir is provided such that liquid escapes over the weir and out of the second region/boiling chamber when the water level in the region/chamber exceeds a predetermined height (determined by the height of the weir).

The Applicant has further appreciated that this arrangement allows even a relatively large heater surface to remain covered with a relatively thin covering of liquid and so avoid overheating.

In all embodiments of the invention the heated or boiling liquid exiting the heating chamber could be dispensed directly into a user's receptacle, e.g. through a spout, or could be conveyed to another part of an appliance for further treatment.

In accordance with various aspects of the invention, steam is allowed to exit from the second region or boiling chamber separately from the heated liquid. The steam could be vented directly to the atmosphere although it is preferably directed to exit from a part of an appliance away from the user in normal use. It could, for example, be vented to the rear of the appliance. In other embodiments the steam could be captured and condensed in a suitable trap, drip tray or the like. This could be a special drip tray or, more conveniently, a drip tray beneath the spout could be used. In all of these cases it is preferred in some embodiments of the invention that the steam path between the second region/boiling chamber and the atmosphere is sufficiently restricted to give rise to a pressure difference across it in use of between 0.1 and 1 bar, preferably between 0.2 bar and 0.5 bar. By allowing the second region/boiling chamber to become slightly pressurized in use as compared to the atmosphere, the boiling temperature of the water or other liquid is slightly increased which helps to raise the temperature of the liquid actually received in the user's receptacle.

BRIEF DESCRIPTION OF THE DRAWINGS

A preferred embodiment of the invention will now be described, by way of example only, with reference to the accompanying drawings in which.

DETAILED DESCRIPTION OF THE INVENTION

Figure 1:
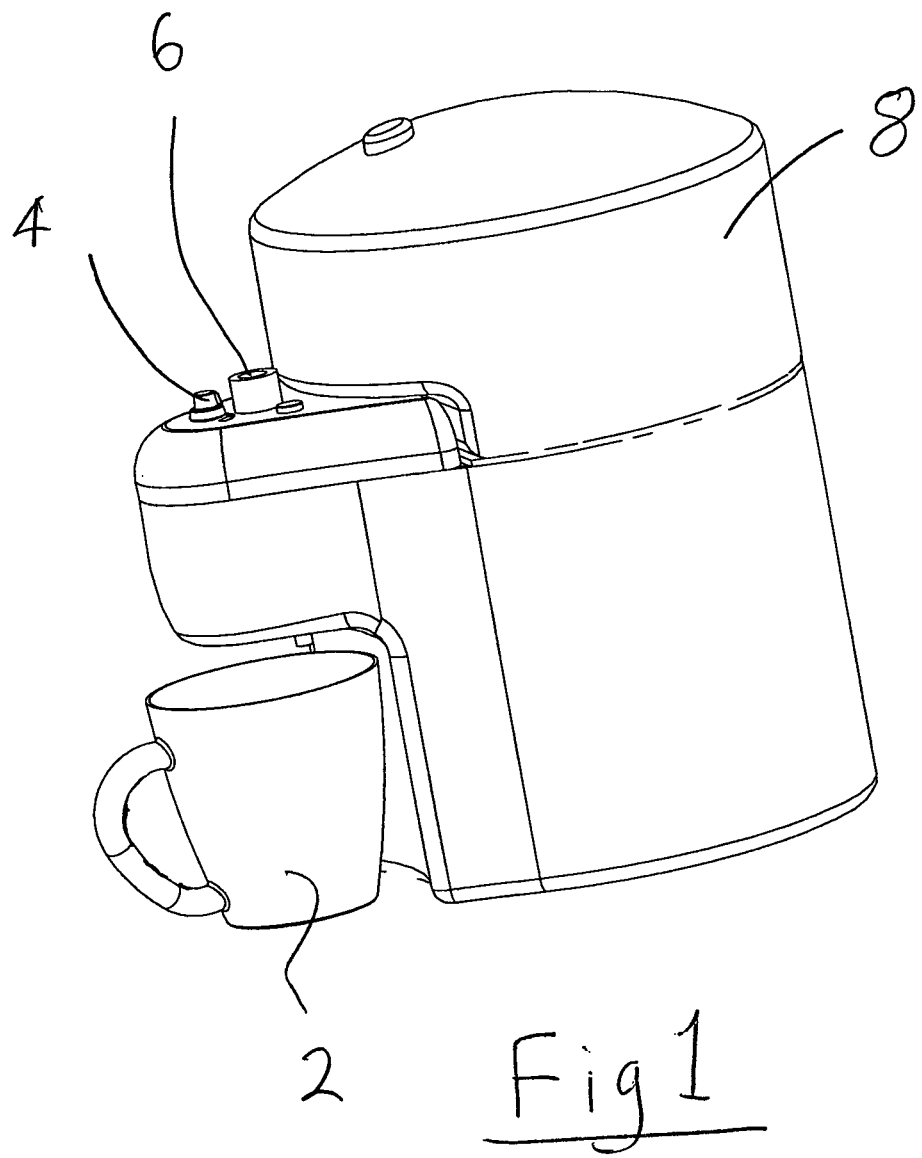
FIG. 1 is a perspective view of a boiling water dispensing apparatus embodying the invention.

FIG. 1 shows an embodiment of the invention which can be used to dispense boiling water, on demand into a cup 2 for making hot beverages. The temperature of the water can also be adjusted by turning a knob 4. The dispense temperature can be varied from 65° C. to just boiling and beyond that to 'rolling boil' where more energy is put into the water to ensure that the whole volume is fully boiling. The amount of water to be dispensed is controlled by a second knob (not shown). Also visible is a steam outlet 6. On the upper part of the main part of the apparatus is a water tank 8 which must be filled periodically by a user.

Figure 2:
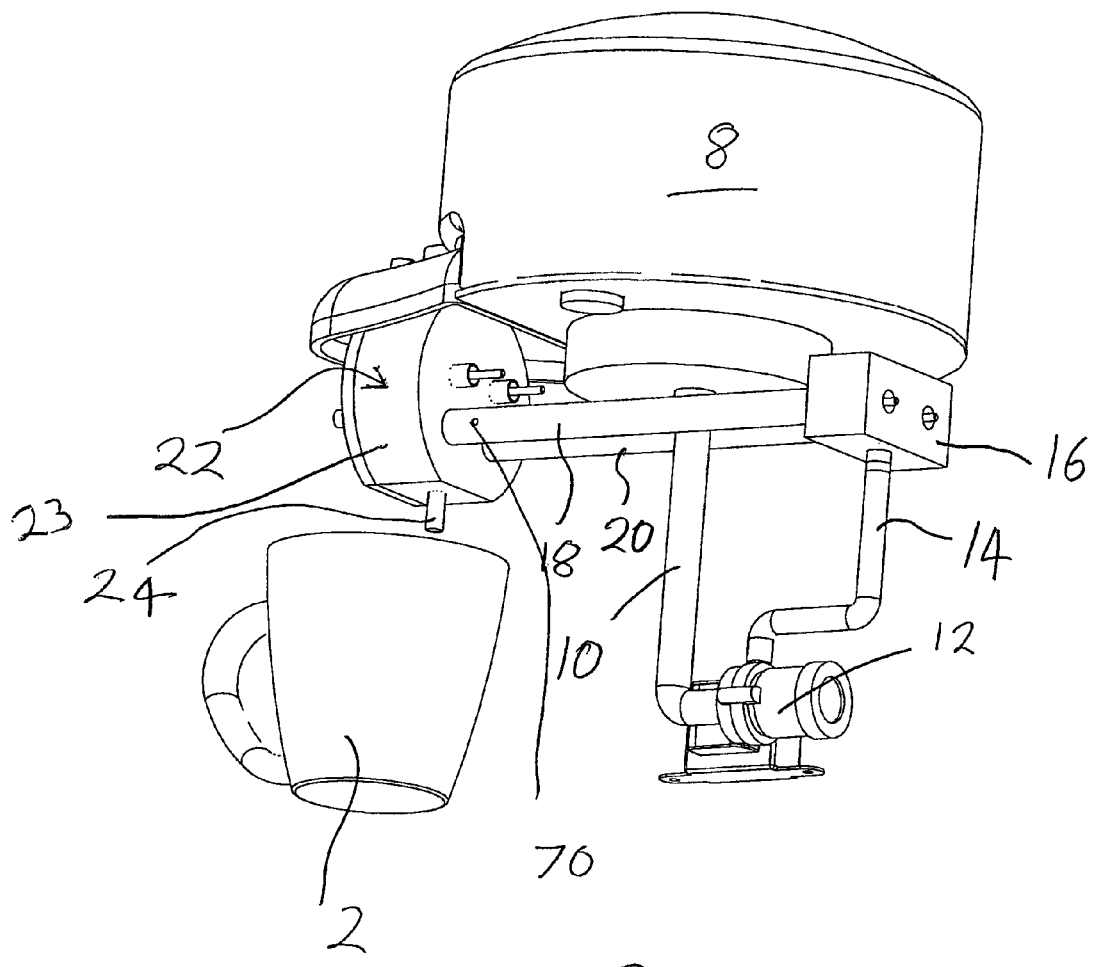
FIG. 2 is a partly cut-away view of the apparatus showing the main components thereof.

FIG. 2 shows some of the main internal components of the apparatus with other parts omitted for clarity. From here may be seen the water tank 8, extending downwardly from which is an outlet pipe 10 connected to the inlet side of a low voltage, centrifugal pump 12. The outlet side of the pump 12 is connected via a tube 14 to a water distribution plenum block 16 which distributes water entering the block between two parallel flow heater sections 18, 20 as will be explained in greater detail below with references to FIGS. 4 and 5.

At the downstream end of the flow heater portions 18, 20 is a boiling pool 22. This is formed by a deep-drawn stainless steel cup 23 fitted to an approximately circular stainless steel element head 54 (see FIGS. 3 and 5 to 7). The boiling pool 22 has an outlet spout 24 projecting downwardly from it for dispensing heated water into the user's cup 2.

At least one of the flow heater portions 18, 20 has a small hole 70 drilled into the side of its outer casing near to the boiling pool to accommodate a thermistor. Alternatively it could be placed on the outside of the casing.

Figure 3:
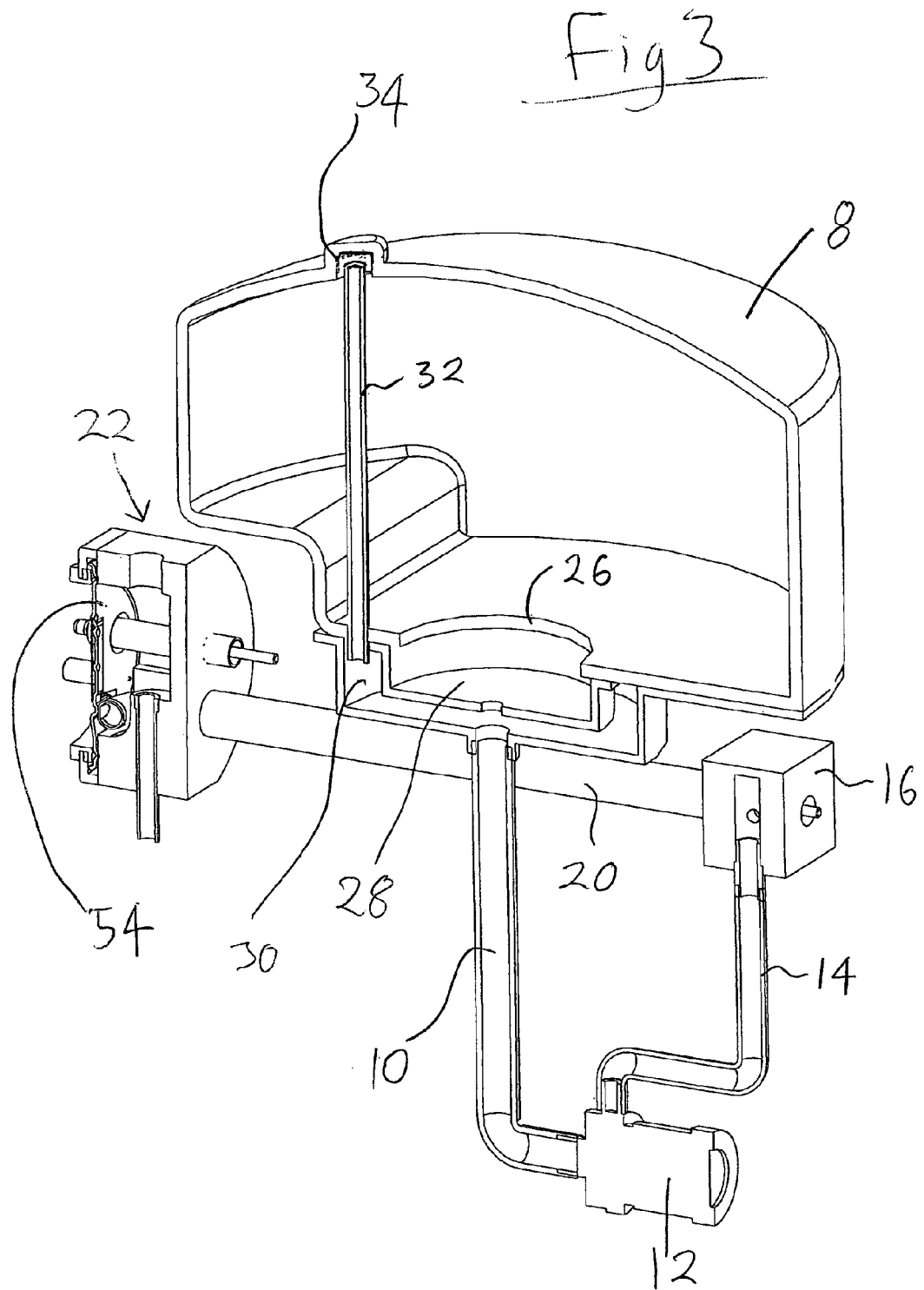
FIG. 3 is a cross-sectional view through the water reservoir and other components.

The cross-section of FIG. 3 shows the interior of the water tank 8. From this it can be seen that the base of the water tank 8 has a circular aperture 26 which is designed to receive a water filter, for example the applicant's Aqua Optima water filter. This is represented very schematically by the component marked with the reference numeral 28. The water filter 28 has a restricted outlet aperture (typically of the order of 4 mm) which has the additional benefit in the present context that it is too small to allow air to pass into the filter when there is water in the filter; were this not the case bubbles of air could get into the filter and reservoir so allowing the continuous flow of water. The lower part of the water filter 28 is received inside a further, intermediate holding chamber 30, in the center of which is an outlet connected to the pipe 10 which connects it to the pump 12.

A vertical tube 32 extends from the upper part of the holding chamber 30 into the main water tank 8 and terminates just inside an indented portion 34 of the top of the water tank 8. This allows pressure equalization between the holding chamber 30 and the water tank 8.

Figure 4:
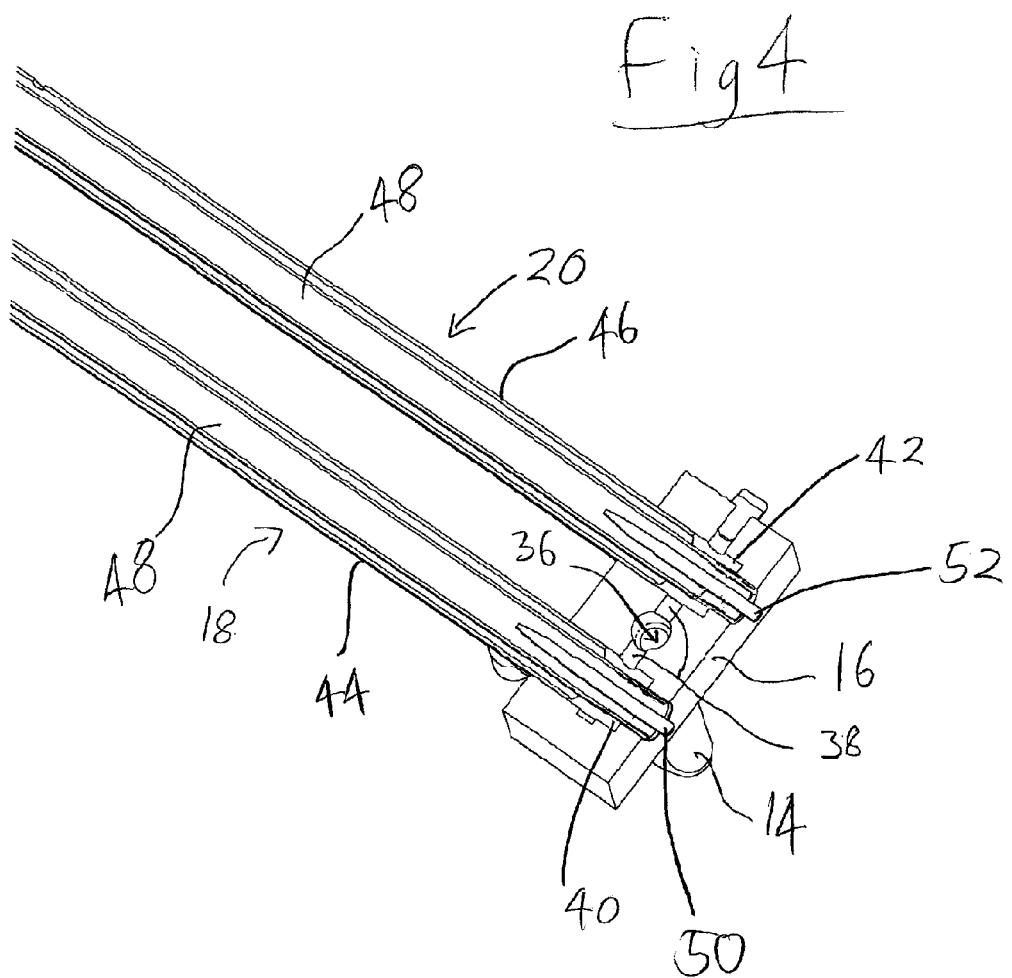
FIG. 4 is a horizontal cross-section through the water inlet end block and flow heater pipe.

FIG. 4 shows a horizontal cross section through the distribution plenum block 16 and the two parallel flow heaters 18, 20. The outlet side of the pump (not shown here) connects via a tube 14 to a vertical inlet channel 36 in the distribution block 16. This connects within the block to two laterally extending tubes 38 which open out into corresponding larger bore circular section cylindrical chambers 40, 42 at right angles to the lateral tubes 38. The cylindrical chambers 40, 42 receive the ends of the two flow heater sections 18, 20 respectively. As can now be seen, each of the flow heater sections 18, 20 comprises an outer jacket 44, 46 and a length of a sheathed immersion-type heating element 48 which, although not depicted, comprises a stainless steel casing and a coiled resistance wire packed in magnesium oxide insulating powder. The cold tails 50, 52 of the immersed element emerge through holes provided in the rear of the distribution plenum block 16.

The two flow heater sleeves 44, 46 are wider in diameter than the corresponding heating element 48 and so define therebetween a corresponding annular channel for each of the flow heater sections 18, 20. As may be seen from this cross-section, the sleeves 44, 46 make a sealing connection with the front end of the circular channels 40, 42 in the block 16 but stop short in those channels of the point where they meet the lateral channels 38 so that the aforementioned annular channel in each of the flow heaters 18, 20 is open to the cylindrical chambers 40, 42 formed within the distribution block 16 whilst the sheathed element 48 extends through the block and is sealed against it. The result of this is that there is a fluid path from the block inlet 36, via the lateral channels 38 and the cylindrical chambers 40, 42 to the interior annular channels of the two flow heaters 18, 20.

Figure 5:
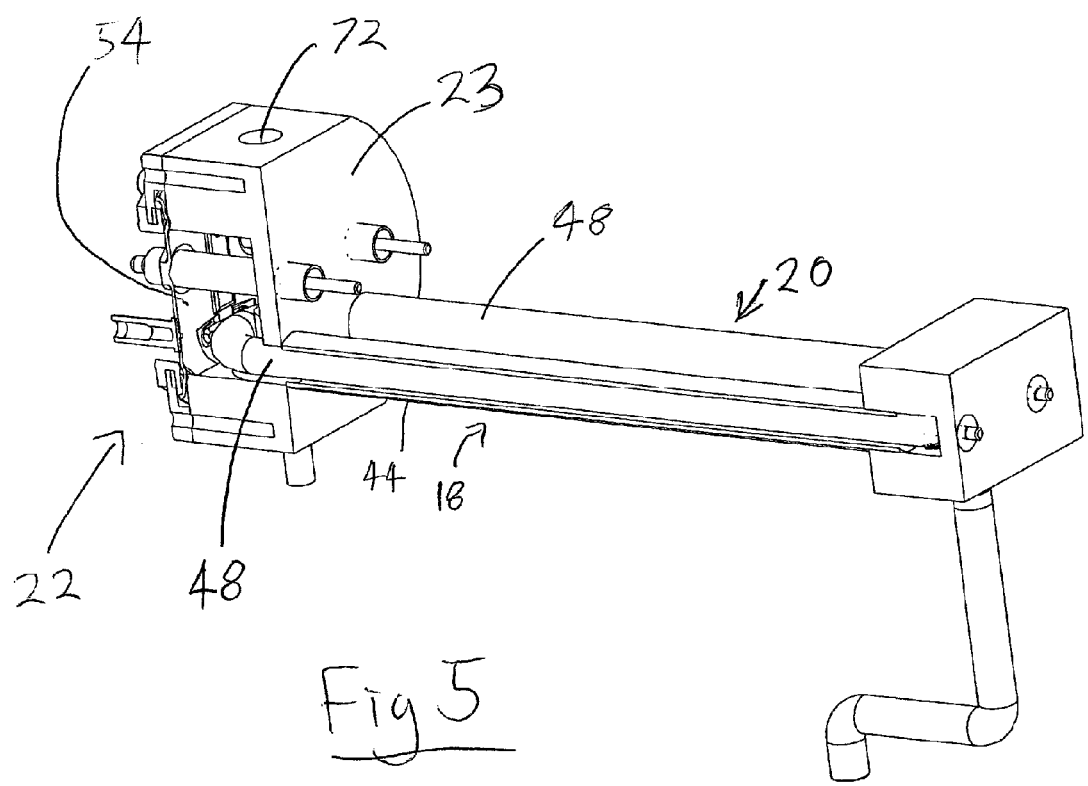
FIG. 5 is a vertical section showing the interior of one of the flow heaters.

FIG. 5 shows the full length of the flow heaters 18, 20. From here it can be seen that the respective outer sleeves 44, 46 thereof are sealed at the other end to the boiling chamber 22. The heating element 48 extends into the boiling chamber 22 and is bent round to form two elongate arms which respectively form part of the two flow heaters 18, 20. This is seen more clearly in FIGS. 6 and 8.

Figure 6:
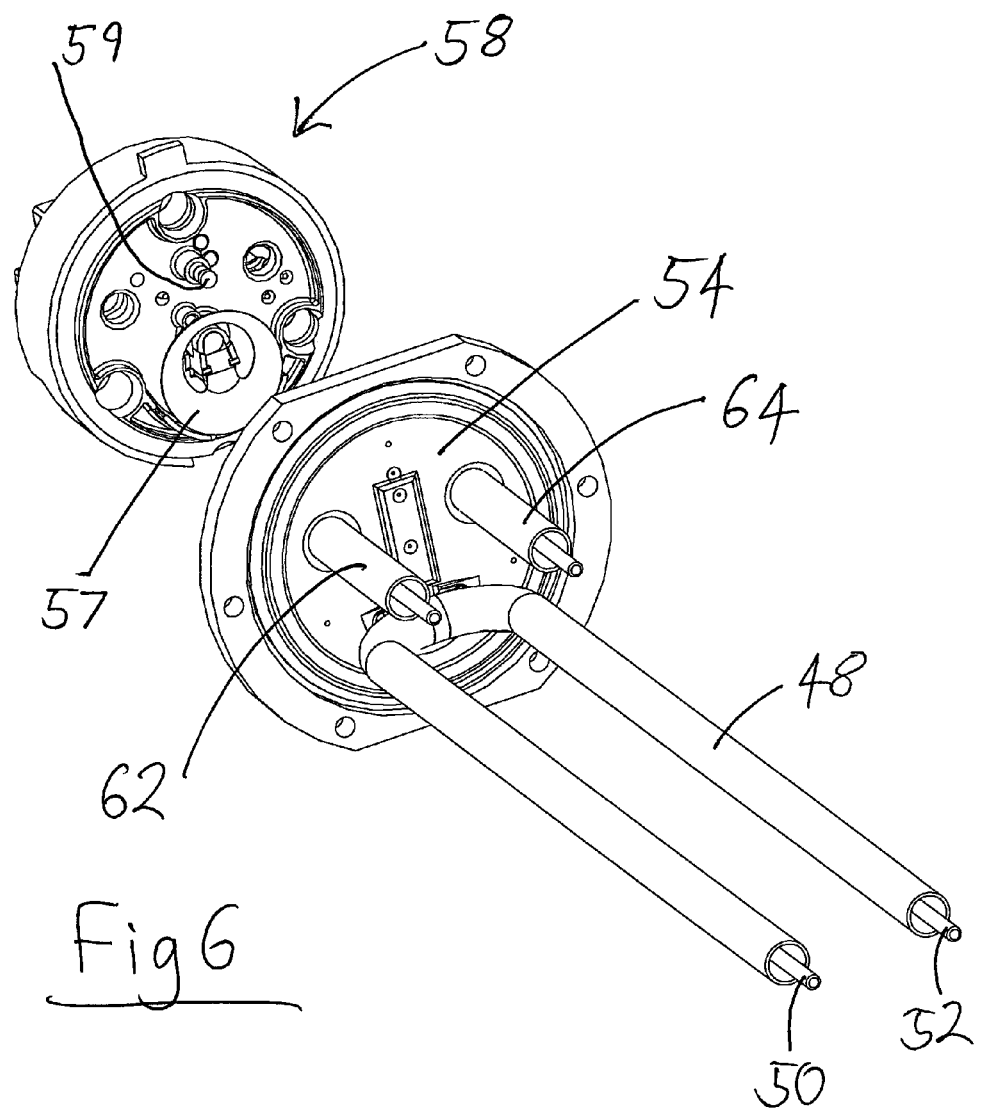
FIG. 6 is an exploded view of the element head and control unit from the front.
Figure 7:
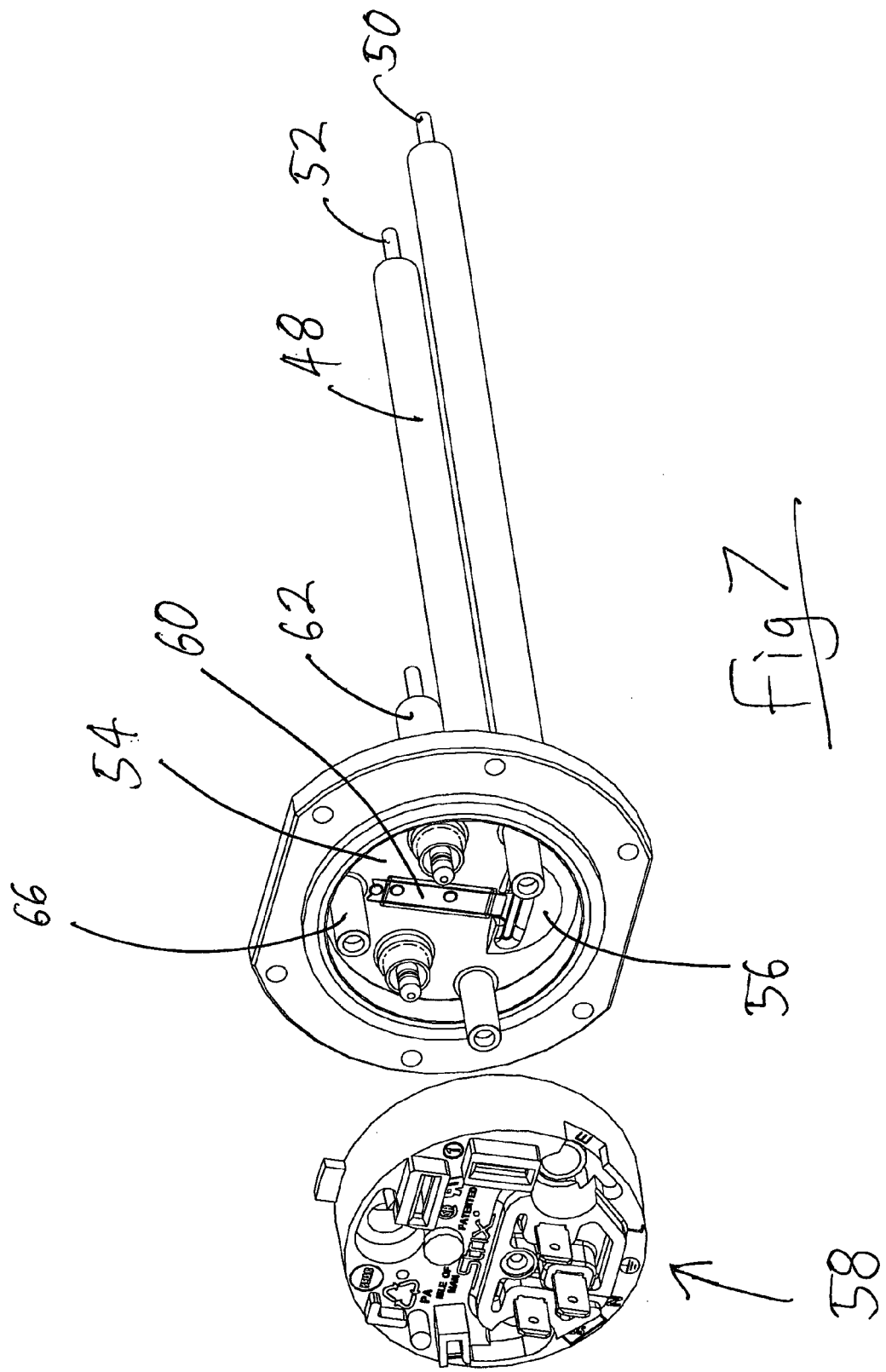
FIG. 7 is an exploded view of the element head and control unit from the rear.

As can be seen from FIGS. 5 and 6, the bent portion of the element 48 is brazed to an immersed element head plate 54 which closely resembles the element head plates seen in traditional immersed element kettles. This arrangement is known as a hot return and, as can be seen from FIG. 7, the other side of the head plate 54 is formed with a semi-circular indentation 56 to receive the snap-acting bimetallic actuator 57 of a standard immersed element control unit 58. FIG. 7 also shows a copper strip 60 extending from the hot return against which bears a nylon thermal fuse 59 of the control unit 58 for providing secondary level overheat protection. Alternatively in nickel-plated copper immersed element heads, no copper strip is required as is also well known in the art.

It will be appreciated by those skilled in the art looking at FIG. 7 that the cold tails of the element 50, 52 do not project through the element head 54 as would be conventional for an immersed kettle element, but rather they project through the distribution plenum block 16 (omitted for clarity in FIG. 7). Instead, two dummy cold tail components 62, 64 project through the element head 54 to make electrical contact with the control unit 58 and are in turn connected by means of flying leads (not shown) to the cold tails proper 50, 52. This allows a standard production control unit 58 to be employed without modification, which is a substantial cost saving as against having to design and produce a new dedicated control unit. The element head is provided with three mounting studs 66 for the control unit 58.

Figure 8:
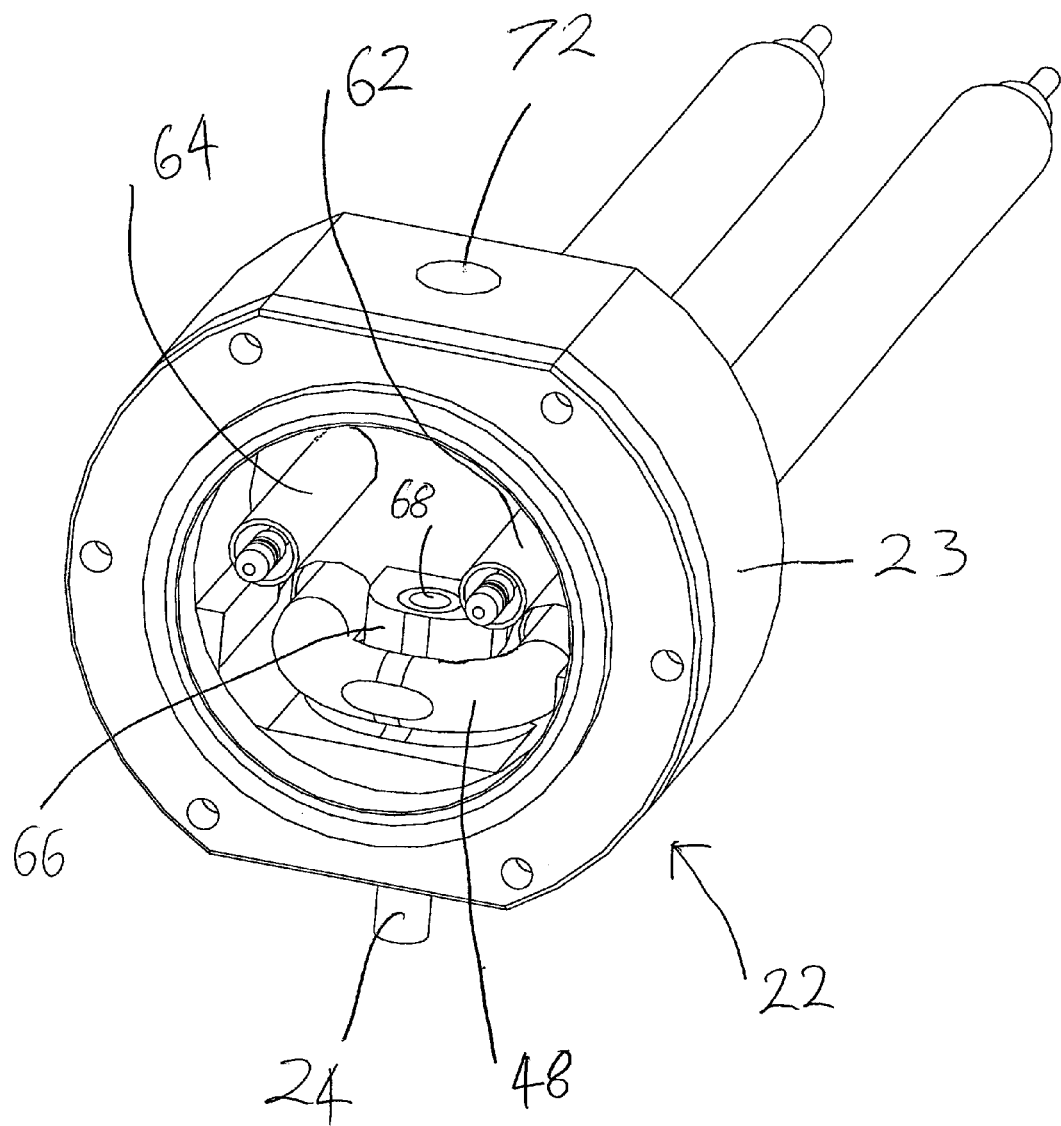
FIG. 8 is a view of the boiling chamber with the element head removed for clarity.

The interior of the boiling chamber 22 is best seen from the view of FIG. 8 which has the element head 54 removed. From here it can be seen that the chamber 22 is broadly of a squat cylindrical shape although its internal volume is limited by the two dummy cold tails 62, 64, the bent portion of the element 48 and by a vertically protruding boss 66 which has a central bore 68 in communication with the outlet spout 24. The height of the boss 66 is approximately level with, or slightly the level of the top of the element tube 48. Taking into account the meniscus depth, this ensures that the element 48 remains just covered in water, so preventing overheating in normal use. A hole 72 is formed in the top wall section of the cup 23 forming the boiling chamber 22 to provide a steam outlet which communicates with the steam outlet 6 at the top of the appliance.

Figure 9:
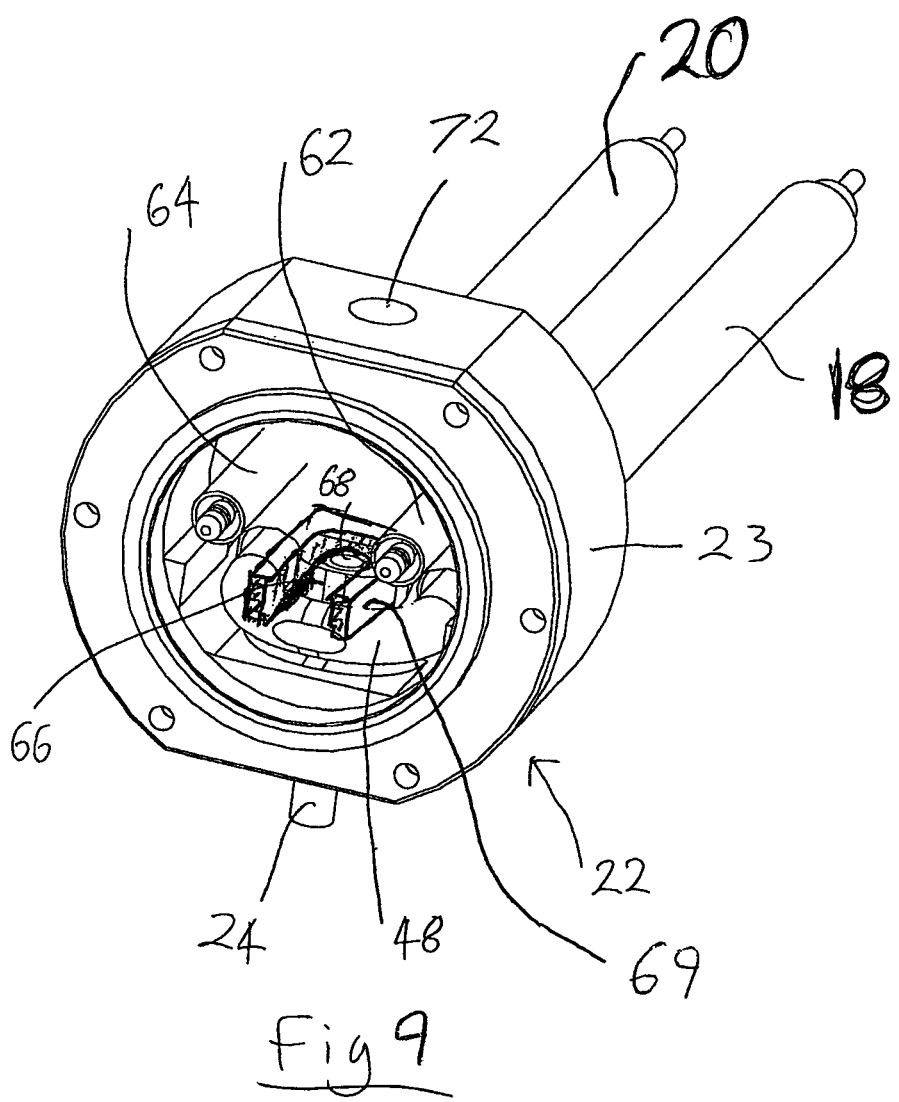
FIG. 9 is a view similar to FIG. 8 of a variant of the boiling chamber.

A variant of this embodiment is shown in FIG. 9. In this embodiment an additional U-shaped baffle 69 is provided above the boss 66 and with its open end facing away from the ends of the annular heating channels 20. This prevents water emerging the channels from flowing directly through the outlet 68, thereby ensuring it is properly heated to boiling.

Operation of the apparatus will now be described. First the user fills the water tank 8 with water by removing it, inverting it, removing the water filter 28 and filling from a tap. The filter 28 is then replaced, the tank re-inverted and then placed back on to the apparatus. The water immediately starts to be passed through the water filter 28 inside it at a rate determined by the restricted outlet from the water filter as is known. As water passes through the filter 28 it begins to fill the connecting pipe 10 and then the lower holding chamber 30, displacing air through the ventilation tube 32 into the sealed head-space of the water tank 8. When the water level in the holding chamber 30 reaches the bottom of the ventilation tube 32, air can no longer be expelled from the chamber and so the flow of water stops.

When the user wishes to dispense water he/she sets the required temperature on the first knob 4 and then turns the second knob (not shown) round from an 'off' position to the required volume. Initially the controlling circuit (not shown) activates the heating element 48. After a delay of one or two seconds (depending on the temperature of the water already in the heater) the pump 12 is operated to pump water from the lower chamber 30 through the pipes 10 and 14 into the distribution plenum block 16. In other embodiments the pump may be started before the heater.

As water passes through the channels 38 in the plenum block, the flow is balanced between the left and right channel. The bore of these channels 38 is chosen so that the pressure drop through this section is greater than for all the rest of the hydraulic system. This is very important in maintaining correct flow through the downstream annular channels 18,20. For example, if a minor restriction arises in one channel 18, 20 but not the other, there is little effect on the flow rate, as the dominant pressure drop is through the plenum channels 38. A pressure drop ratio of say 10:1 gives the required effect. For example if the pressure drop across the tubular heaters 18, 20 is equivalent to a 40 mm head of water, the pressure drop across the plenum channels 38 would be equivalent to a 400 mm head.

Once water has been pumped into the distribution block 16, it is pumped through this and down the annular channels of each of the two flow heaters 18, 20 between the heating element 48 and the corresponding stainless steel outer jacket 44, 46. This heats the water rapidly as it passes through from ambient temperature (of the order of 20° C.) in the distribution block 16 to approximately 85° C. at the downstream ends of the flow heaters 18, 20.

The temperature of the water is monitored by the thermistor projecting into the holes 70 in the sides of the flow heaters 18, 20 near the boiling chamber 22. The temperature can be monitored accurately and reliably here since the water is not boiling and therefore there is no significant amount of steam bubbles within it.

The water then passes out of the flow heaters 18, 20 and into the interior of the boiling chamber 22 where it begins to fill this chamber, thereby covering the curved portion of the element 48 which projects into the boiling chamber. The curved part of the heating element 48 continues to heat the water in the boiling chamber, now producing significant numbers of bubbles which break the surface of the pool of water in the chamber and escape as steam. However, the steam can easily escape the boiling chamber by means of the steam outlet 72 at the top of it.

Referring particularly to FIG. 8, it can be seen that as the water level in the boiling chamber 22 rises level with and above the top of the protruding boss 66, it will start to pour out through the aperture 68 and through the outlet spout 24 and into the user's cup 2. The pumped flow rate and the power of the element 48 are matched such that by the time the water leaves the boiling chamber through the aperture 68 and spout 24 it is effectively boiling. This includes an 'over-allowance' of energy input as compared to the energy that would theoretically be required to raise the water temperature to 100° C. to ensure a rolling boil and thus that the water attains a true temperature very close to boiling. The height of the boss 66 is chosen to ensure that the element 48 remains covered in water regardless of the flow rate.

Boiling water continues to be dispensed until the volume set by the user has been dispensed. At which point the pump 12 is switched off. To increase the energy efficiency of the device, the heating element 48 is turned off about 2 seconds before the pump is turned off. There is sufficient stored energy in the element and other components to ensure that the water continues to be boiled.

Referring back to FIG. 3, it will be appreciated that because of the intermediate holding chamber 30 from which the water is drawn, water can be drawn at a greater rate than it passes through the filter 28. The capacity of the chamber 30 is designed so that, taking into account the extent to which it is replenished while the pump is running, a large ordinary mug can be filled with water before the flow rate becomes too low (i.e. limited by the flow rate through the filter) and so the apparatus has to switch off to prevent the element 48 overheating. To give an example, assuming it takes 15 seconds to dispense 250 mL of water (equivalent to a large mug) at 65° C., only 100 mL will flow through a typical Aqua Optima filter in that time. However by providing an intermediate holding chamber of only 150 mL, the large mug can be safely filled without the element overheating.

It will also be appreciated that the intermediate holding chamber 30 means that the head of pressure of the water entering the pump 12 at least initially is known, which means that a known flow rate can be achieved even by using a relatively inexpensive and quiet centrifugal pump. Of course, once the chamber refills with water from the tank 8, dispensing can be recommenced.

If the water tank 8 should run dry, the heating element 48 will begin to overheat. However, this can be sensed by the temperature sensor projecting through the aperture 70 into the flow heaters 18, 20. As a backup the bimetallic actuator on the control unit 58 will sense overheating of the element 48 and therefore snap into its reverse curvature thereby opening a set of contacts in the control unit in the well-known manner. Secondary backup protection is provided by the thermal fuse of the control unit 58, again as is very well known in the art. The element is arranged to ensure that in the case of dry boil or dry switch-on, the hot return portion brazed to the head 53 is the first to become dry. This is achieved by ensuring that the flow in the dual tubes 18, 20 of the first heater is balanced under all adverse conditions (as explained earlier) and also by ensuring that the hot return is slightly higher than the rest of the element 48 by having it and the surrounding tubes 18, 20 slightly inclined. This has a further benefit, on start-up from dry, of ensuring that the tubes 18, 20 are free venting, and that the flowing water can easily push the initial volume of air ahead of it and out into the boil chamber 22 without airlock Should the user wish to dispense water at a lower temperature, he or she can use the knob 4 at the top of the appliance to set a lower temperature which will cause the pump 12 to operate at a higher speed and therefore give a higher flow rate of water through the apparatus which will mean that it is heated to a lower temperature before it is dispensed. Again, having the known head of pressure for the water entering the pump allows the actual flow rate that will be achieved for a given speed to be calculated and hence the temperature of the dispensed water can be calculated. The temperature sensors projecting into the apertures 70 allow the temperature of the water being dispensed through the outlet spout 24 to be predicted from a knowledge of the proportion of the heating element 48 which is upstream of it and the corresponding proportion of the element 48 which is downstream of it—i.e. the curved portion in the boiling chamber. The sensor can also be used to introduce a relative delay between operating the pump and switching on the element 48 depending upon the ambient temperature of the water sitting in the apparatus (e.g. as a result of previous operation) taking into account the temperature of water requested by the user.

Thus it will be seen that the embodiment described above provides the benefit of a flow heater, i.e. being able to dispense a controllable volume of water on demand, but with the significant advantage of being able to provide boiling water. The boiling chamber and the separation of the steam through the steam outlet 72 from the water outlet 68, 24 is key to allowing this and prevents spitting and localized hot spots on the element.

Figure 10:
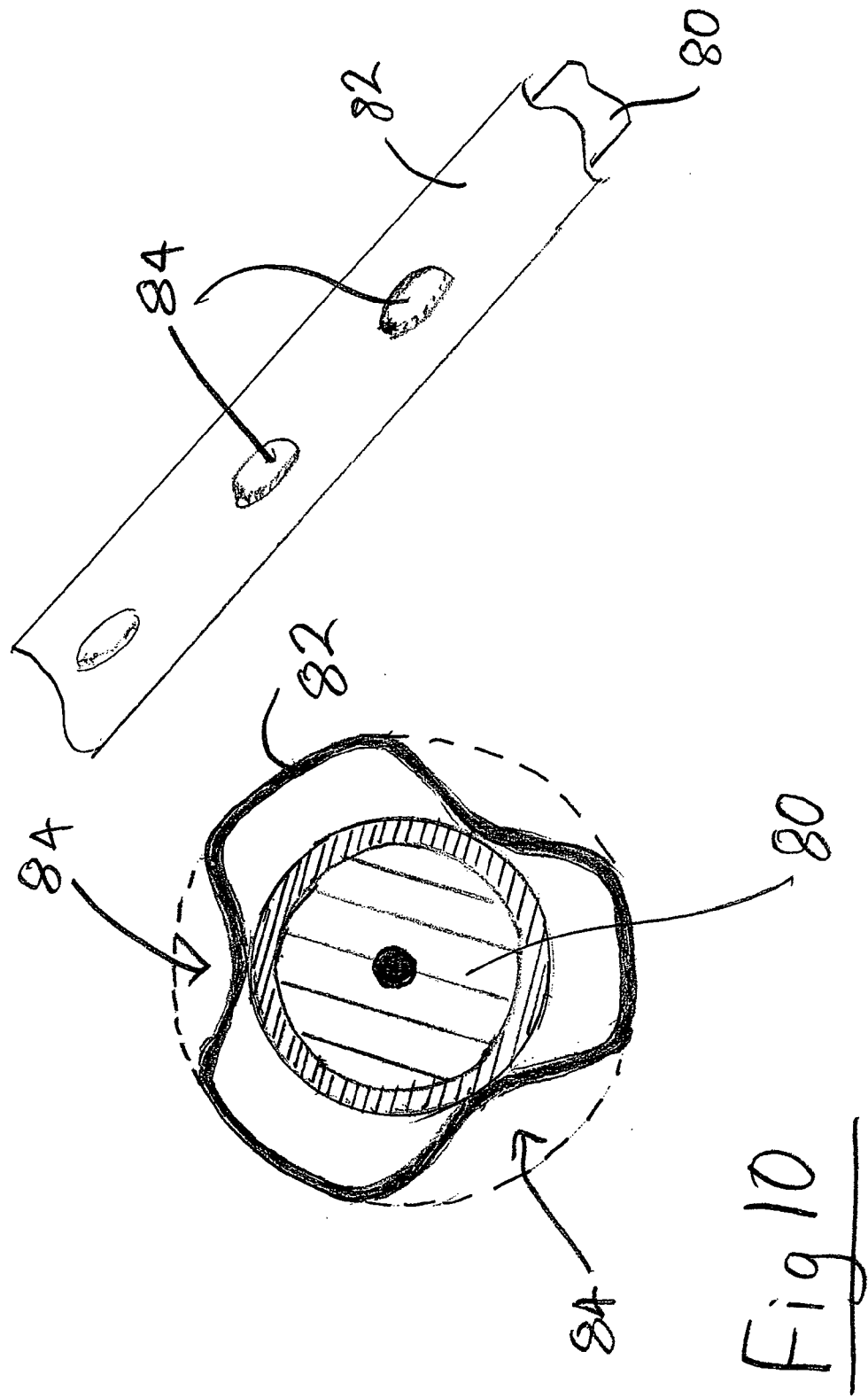
FIG. 10 is a schematic partial plan view and an enlarged cross-sectional view of an element and jacket in accordance with another embodiment of the invention.

Turning to FIG. 10, this shows two views of an assembly of a sheathed heating element 80, of conventional construction, disposed inside a thin stainless steel jacket 82 so that water can flow between the outer surface of the element 80 and the inner surface of the jacket 82. In this respect it is similar to the arrangement described above with reference to the previous embodiment, in particular FIGS. 4 and 5 thereof. However, in this embodiment the stainless steel jacket is formed with a series of indentations 84 spaced both longitudinally and circumferentially which produce protrusions on the inner surface that locally reduce the diameter of the jacket 82 sufficiently that it touches the surface of the sheathed element 80. This maintains the element 80 centrally coaxially disposed in the jacket 82. The indentations 84 do not have any material impact in the flow of water between the element 80 and the jacket 82 since water can still flow substantially all the way round the element 80.

In a variant of this embodiment, the indentations 84 could be merged longitudinally to form continuous depressions with corresponding continuous ribs on the inner surface which would also serve to locate the element 80 centrally. In this variant, separate channels for water flow would be defined between the respective ribs. Of course, the number and distribution of the depressions/protrusions is not critical. Moreover protrusions could be provided on the surface of the element as well or instead. These features may be applied to other embodiments of the invention.

Figure 11:
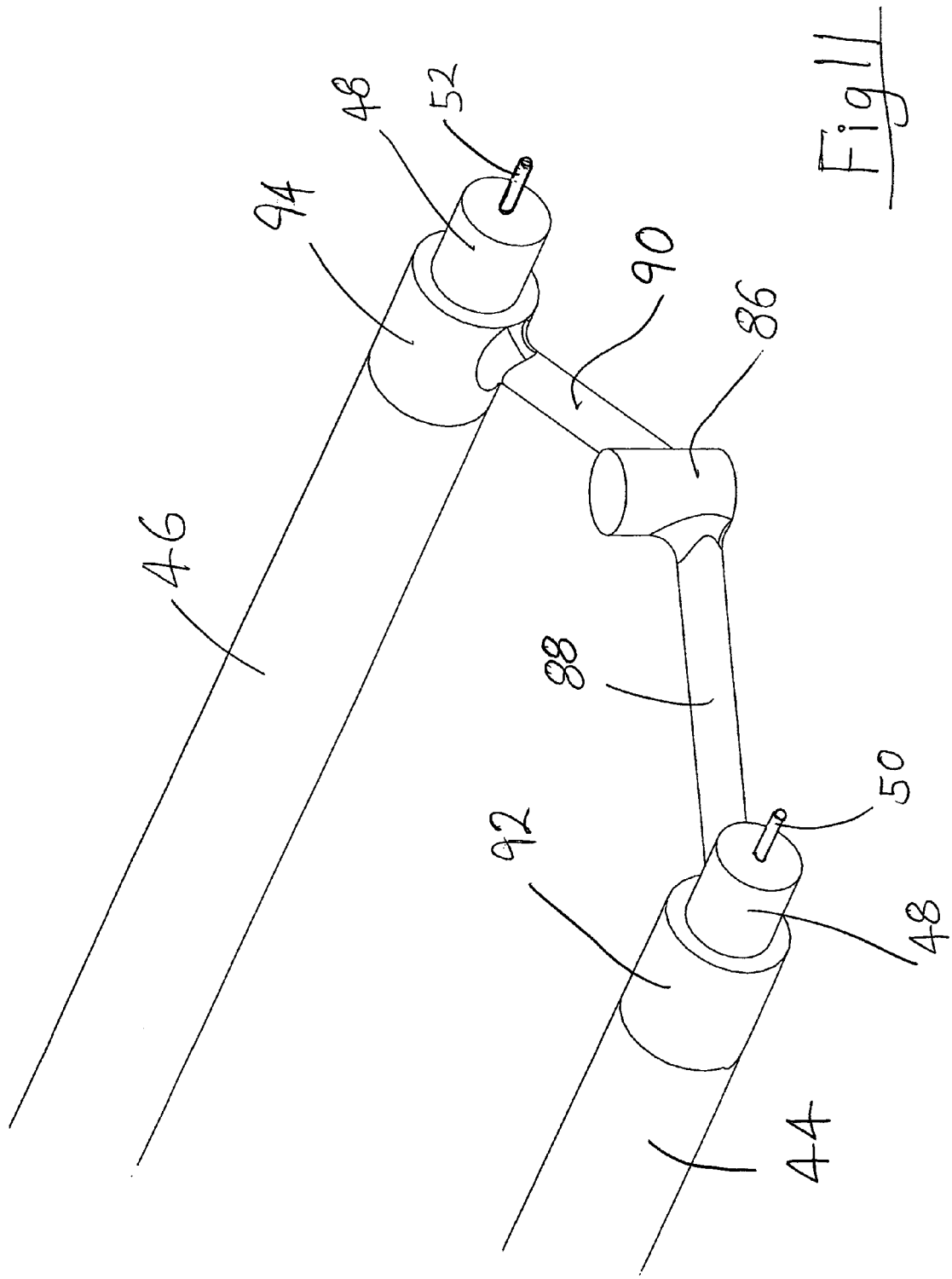
FIG. 11 is an enlarged view of the inlet manifold arrangement of a further embodiment of the invention.

FIG. 11 shows a variant on the embodiments shown in the previous figures with a slightly different arrangement for the water inlet to the annular channels formed between the respective outer jackets 44, 46 and the U-shaped immersion element 48. Instead of the distribution plenum block 16 as shown in FIG. 4, this embodiment has an inlet manifold arrangement comprising a common inlet 86 communicating with two respective branching tubes 88, 90 which direct the water to respective inlet collars 92, 94. As may be seen, the collar 94 provide a sealing connection at one end to the respective outer sleeves 44, 46 of the flow heater section and at the other end provide a sealing connection against the surface of the sheathed heating element 48. This can be arranged so that the element cold tails 50, 52 extend inside the elements 48 far enough that the part of the heater surface in contact with the inlet seal is not heated.

It will further be noted that the branching channels 88, 90 join the respective inlet collars 92, 94 in a direction offset from the central axis thereof. The effect of this is that as the water enters the inlet collars 92, 94 and passes down into the annular channels defined by the sleeves 44, 46 it is given a component of motion around the centrally located element 48 i.e. it has a component of swirling motion as well as a forward velocity component. As this flow pattern continues down the tube the swirling motion will continue which assists in mixing of the water inside the tube and therefore promotes a more even temperature distribution further along the tube which facilitates accurate temperature measurements.

Figure 12:
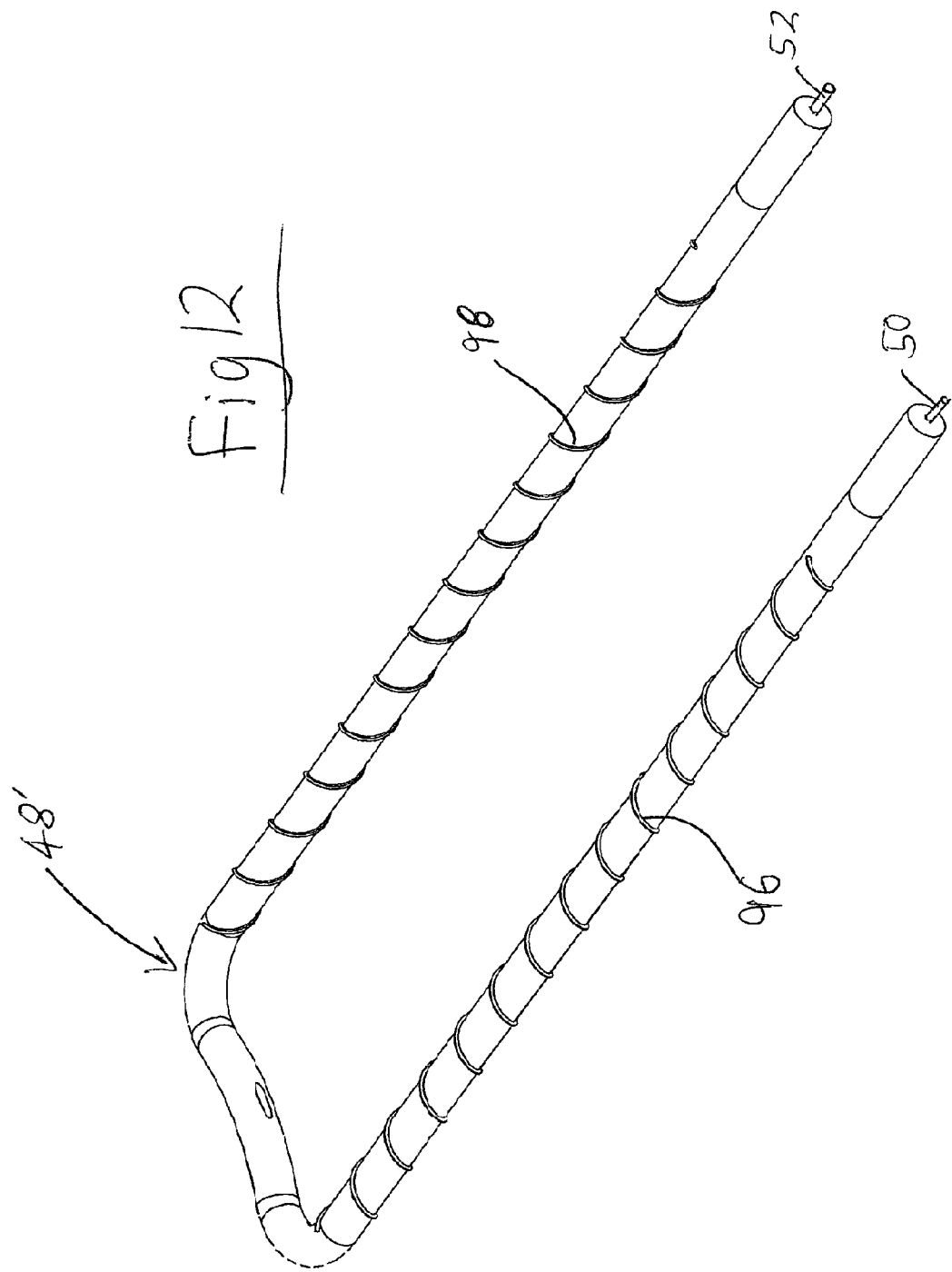
FIG. 12 is an isolated view of a heating element for use in further embodiments of the invention.
Figure 13:
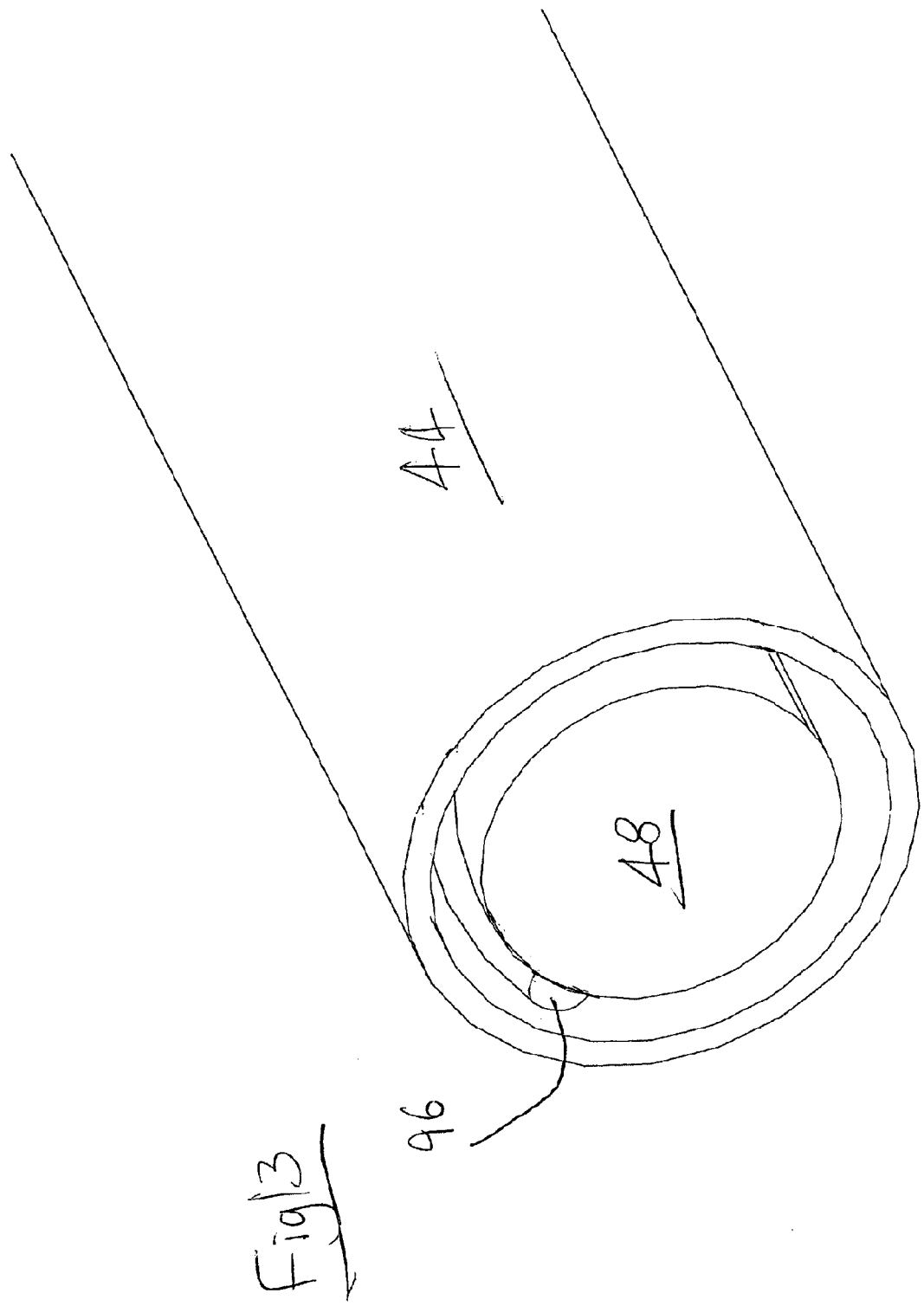
FIG. 13 is a dramatically enlarged cross-section through the heating tube of an embodiment employing the element of FIG. 12.
Figure 14:
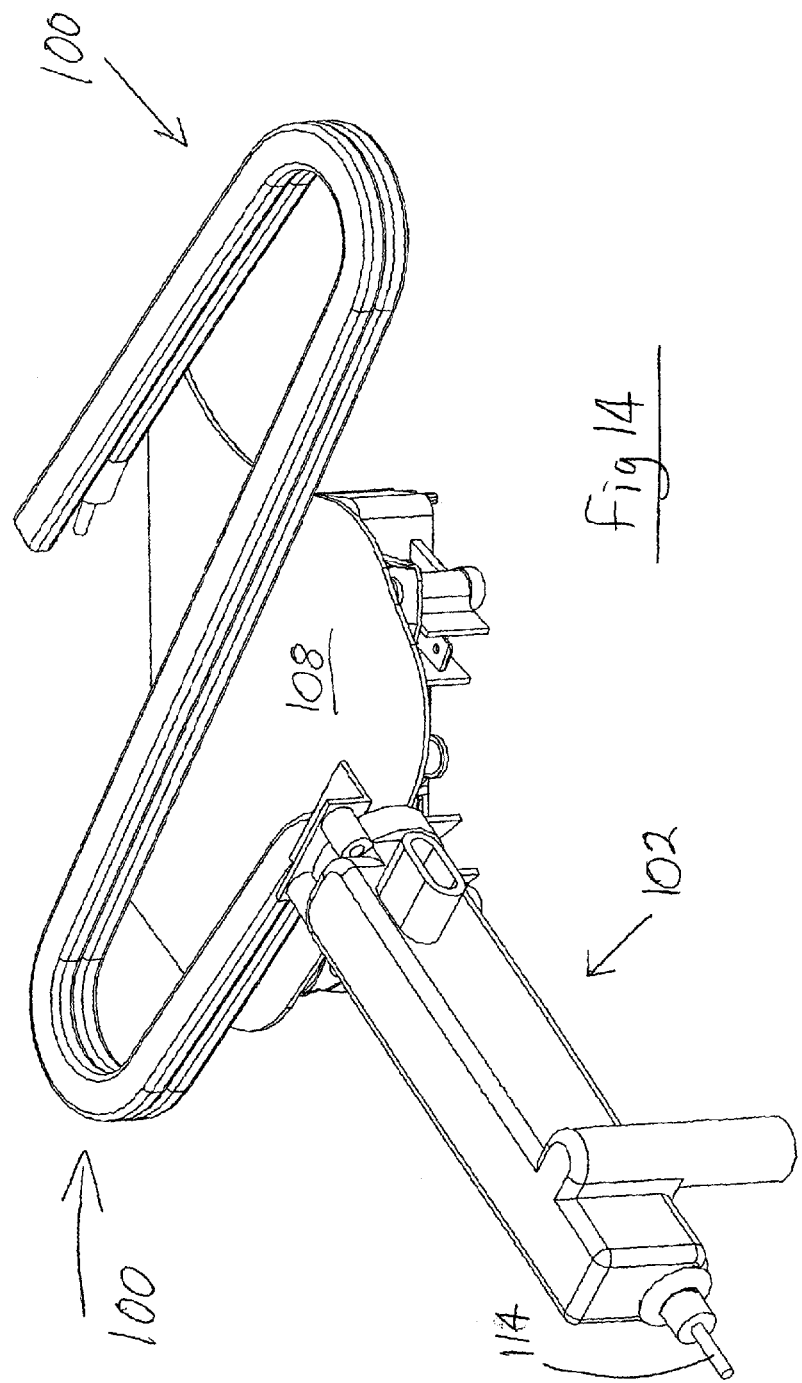
FIGS. 14 & 15 are perspective views of an alternative flow heater in accordance with the invention.

FIGS. 12 to 14 depict another embodiment of a heater which is designed to encourage swirling of the water inside the annular channels of the flow heater. FIG. 12 shows, in isolated view, a sheathed heating element 48' similar to those of previous embodiments. The difference exhibited in this particular embodiment is that each of the two arms of the element has a thin wire 96, 98 wrapped tightly around it in a helical fashion. This is carried out during manufacture prior to insertion of the arms of the element 48' into the respective sleeves 44, 46 (see e.g. FIG. 4) to form the annular channels along which the water flows in use. The wires 96, 98 are conveniently made from stainless steel having a diameter of for example 0.6 mm, although the material, dimensions and pitch of the wire may be chosen to suit the particular application. It will be noted from FIG. 13, however, that in this particular embodiment at least the wire 96 which is wrapped around the element 48 is not wide enough to fill the annular channel formed between the element 48 and the outer sleeve 44 completely. It may, for example, be less than half the height of the channel e.g. approximately a third of the height of the channel. In use the presence of the wire 96, 98 has been found to encourage a swirling motion of water inside the respective channels which, as was explained above, gives a more even circumferential temperature distribution and so facilitates temperature measurements. The arrangement shown in the embodiment of FIGS. 12 and 13 could be used in conjunction with the inlet manifold arrangement shown in FIG. 11, although this is not essential.

A further embodiment of the invention will now be described with reference to FIGS. 14 to 16. Turning initially to FIG. 14, this embodiment comprises broadly a conventional flow heater section 100 which is approximately S-shaped and a boil pool arrangement 102 at the downstream end of the flow heater section 100.

Figure 15:
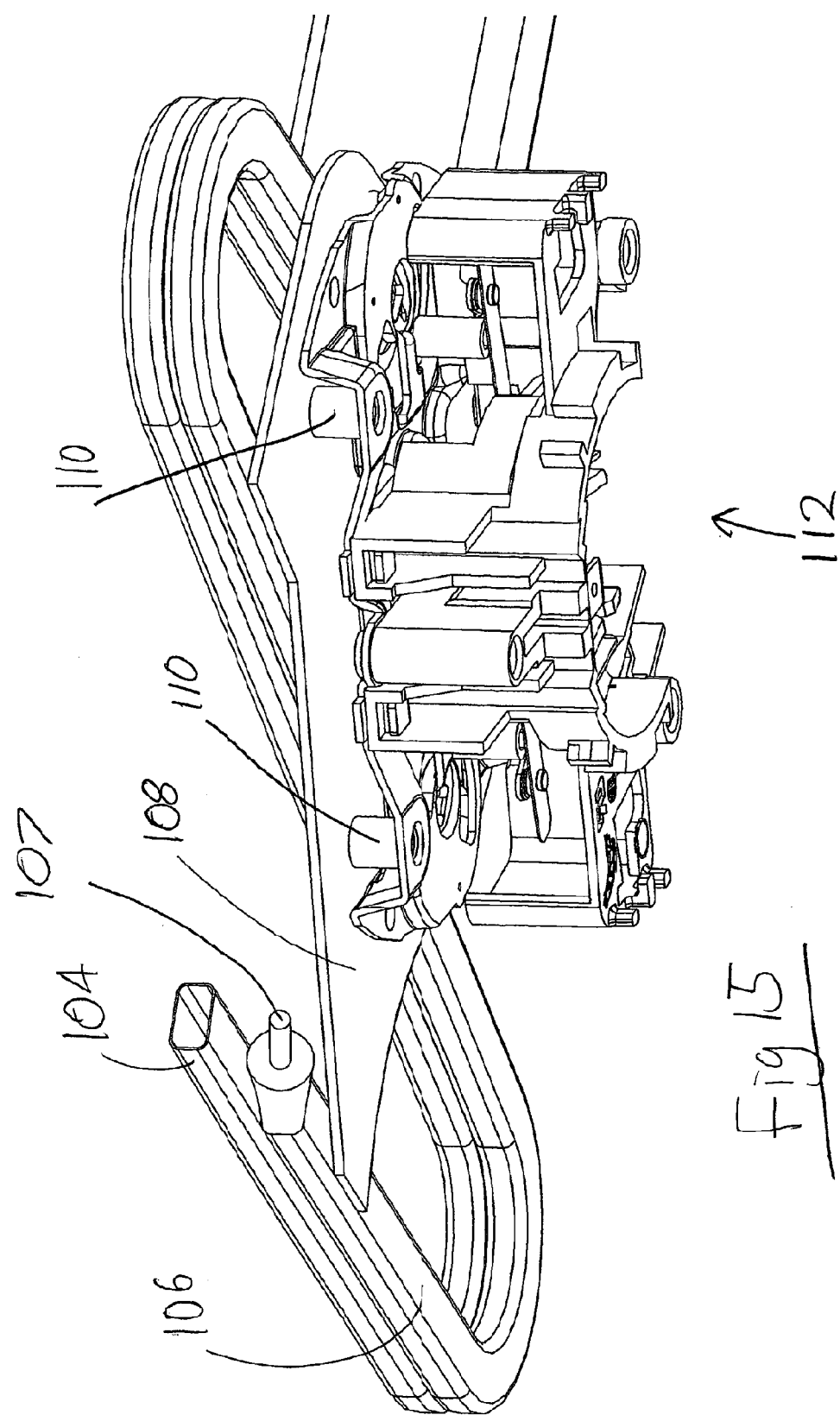

With additional reference now to FIG. 15, it will be seen that the flow heater section 100 comprises an approximately rectangular section tube 104 to the underneath of which is brazed a sheathed heating element 106. The water tube 104 and element 106 conform closely to one another as they bend to take up the approximate S-shape referred to above. An aluminum heat diffuser plate 108 is brazed onto the underside of the heating element 106 along various parts of its length. The heat diffuser plate 108 is provided on its underside with three mounting bosses 110 (only two of which are visible) which permit a thermo-mechanical overheat protection control unit 112 to be mounted in good thermal contact with the heat diffuser plate 108. The control element 112 depicted in these figures is the Applicant's U11 control which comprises a pair of snap-acting bimetallic actuators which are individually operable in the event of an overheat being detected to open respective sets of contacts to interrupt power to the element 106. Of course, many other control arrangements both thermo-mechanical and/or electronic could be employed for this purpose.

Figure 16:
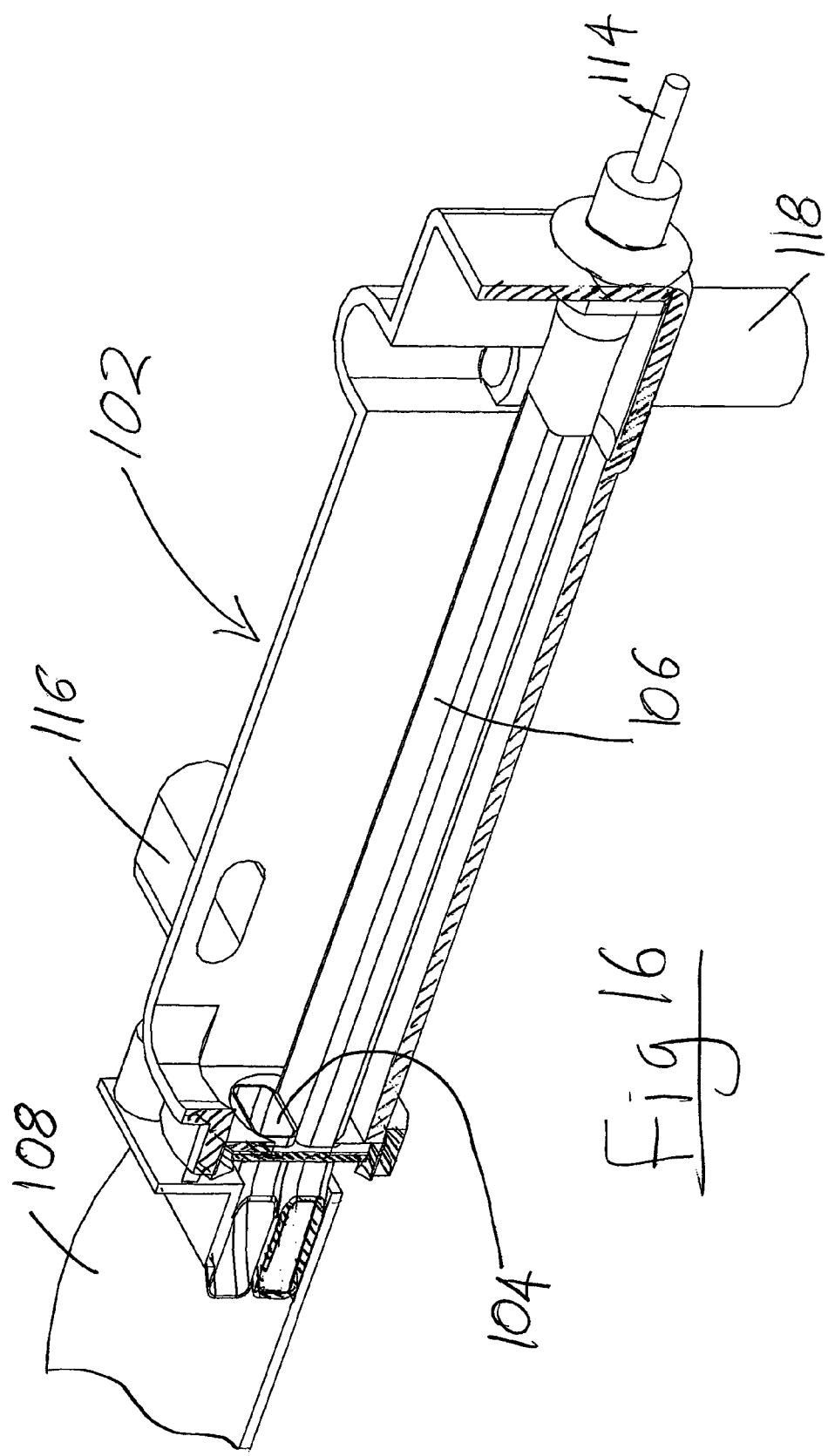
FIG. 16 is a sectional view of part of the heater of FIGS. 14 & 15.

Turning now to FIG. 16, the details of the boil pool 102 may be seen more clearly from the cross-section shown there. The lid of the boil pool 102 has also been omitted for clarity.

FIG. 16 shows a sectional view of the boil pool 102 with its lid removed for clarity. At the upstream end of the boil pool, a sealed entry is provided for the water tube 104 and for the heating element 106. As may be seen from the figure, the water tube 104 terminates just inside the boil pool 102 whilst the element 106 extends across the length of the boil pool 102 to project from the other end via another sealed aperture. This permits electrical connection to be made to the other cold tail 114.

It will be seen that the boil pool 102 has an overall elongate rectangular shape in which the portion of the element 106 inside it occupies the lower portion, although water can pass all the way around it. An aperture in the upper part of one of the side walls of the boil pool opens out into a steam vent 116 which allows steam to be vented to atmosphere away from the user or to be captured and condensed in a suitable trap, drip tray or the like. Near the downstream end of the boil pool 102 is a hot water outlet tube 118 which extends vertically up into the boil pool to a height just above the height of the element 106. The hot water outlet 118 is offset to the side of the element 106 and is accommodated in a suitable lateral extension of the vertical wall.

Operation of this embodiment of the invention is similar to those previously described. At first the heating element 106 is energized by applying electrical power across the cold tails 107, 114 via connections (not shown) to the control unit 112. Water is also pumped by means of a pump from a reservoir (neither of which is shown) to the upstream end of the water channel tube 104. As explained in the context of previous embodiments, the water pumping may begin simultaneously with, before or after energization of the element as appropriate. As the water flows through the tube 104 it is heated by the element 106 until it emerges in to the boil pool 102 at a temperature of approximately 85° C. The water in the boil pool 102 continues to be heated by the element 106, during which time localized boiling occurs at the element surface, giving rise to violent movement of the water and large bubbles of steam being generated. However, this steam can easily pass out through the steam vent 116, although a tortuous steam path downstream of the steam vent 116 may be provided so that the steam pressure inside the boil pool 102 may be allowed to rise a little above atmospheric pressure e.g. by 0.25 to 0.5 bar. This slightly raises the temperature at which the water boils so that the exit temperature of the water is maximized.

When water in the boil pool reaches the level of the top of the hot water outlet tube 118 it can then freely flow down the tube and out of the spout of the appliance (not shown) into a user's receptacle. It will be seen therefore that the vertical wall of the outlet tube 118 which is inside the boil pool acts as a weir to maintain a minimum water level inside the boil pool. Since this minimum water level is above the top of the element 106, it may be ensured that during normal operation the element 106 remains covered with water and cannot therefore overheat. However, in the event of the reservoir running out of water or the appliance being switched on without any water in, the temperature of the element 106 will rise very rapidly. This rapid temperature rise is communicated by means of the aluminum heat diffuser plate 108 to the bimetallic actuators of the control unit 112 which causes them to operate thereby opening their respective contacts and interrupting the power supply to the element 106. Thus dangerous overheating and/or damage is prevented. It will be noted that the section of element 106 inside the boil pool is not in direct thermal contact with the heat diffuser plate 108. This has a positive advantage in the situation where the appliance runs out of water in the reservoir since in those circumstances the element bonded to the tube 104 will begin to overheat first whilst the portion of the element 106 in the boil pool remains immersed in the minimum pool of water retained by the weir formed by the outlet pipe 118. Accordingly, even in these circumstances the power to the element may be rapidly interrupted to prevent overheating.

Although this invention has been shown and described with respect to the detailed embodiments thereof, it will be understood by those skilled in the art that various changes in form and detail thereof may be made without departing from the spirit and the scope of the invention.

What is claimed is:

1. An appliance for providing heated water on demand comprising:
 a water tank;
 a water flow heater that includes a single heating element having an activated state and a deactivated state, a flow conduit, and a final heating chamber, and the final heating chamber includes a water outlet and steam outlet orifice, wherein the water outlet is functionally independent of the steam outlet orifice;
 wherein the water outlet and the steam outlet orifice are positioned within the final heating chamber to permit steam to exit the final heating chamber via the steam outlet orifice at the same time and independent of water exiting the final heating chamber via the water outlet;
 a pump functionally independent of the water flow heater, disposed to pump a flow of water from the water tank to the water flow heater;
 wherein the water flow heater is configured so that water flow pumped passing through the water flow heater travels through the flow conduit and subsequently through the final heating chamber;
 wherein a first portion of the single heating element is disposed within the water flow heater in proximity to the flow conduit and a second portion of the single heating element is disposed in proximity to and within the final heating chamber, and in the activated state the single heating element produces heating power adequate to heat the flow of water exiting the flow conduit to a first temperature below boiling, and adequate to heat the flow of water within the final heating chamber to a boiling temperature to provide heated water on demand.

2. An appliance as claimed in claim 1 wherein the final heating chamber is configured to provide a steam escape path from the final heating chamber to the atmosphere through the steam outlet orifice, the steam escape path being sufficiently restricted to give rise to a pressure difference across it in use of between 0.1 and 1 bar.

3. An appliance as claimed in claim 1 wherein the final heating chamber is configured to provide a steam escape path between the final heating chamber and atmosphere through the steam outlet orifice, the steam escape path being sufficiently restricted to give rise to a pressure difference across it in use of between 0.1 and 1 bar.

4. The appliance of claim 1 wherein the final heating chamber is configured such that when the appliance is positioned for operation the water outlet is disposed a vertical distance below the steam outlet orifice.

5. The appliance of claim 1 wherein the final heating chamber is configured such that when the appliance is positioned for operation the water outlet is disposed a vertical distance below the steam outlet orifice, and is configured such that water flow passing through the final heating chamber has an upper water surface disposed above the water outlet within the final heating chamber, which upper water surface and the final heating chamber define a water free space vertically above the upper water surface.

6. The appliance of claim 5, wherein the steam outlet orifice extends through a wall portion of the final heating chamber that defines the water free space.

7. The appliance of claim 5 further comprising a weir disposed within the final heating chamber, which said weir is configured such that the water flow passing through the final heating chamber passes over the weir and out of the final heating chamber.

8. The appliance of claim 1 wherein said single heating element is disposed within the flow conduit and within the final heating chamber.

9. The appliance of claim 1 wherein the single heating element comprises a sheathed resistance heating element.

10. The appliance of claim 1 wherein the single heating element is disposed outside of the flow conduit.

11. The appliance of claim 1 wherein the single heating element is disposed within the flow conduit such that the flow of water within the flow conduit surrounds a periphery of the single heating element.

12. The appliance of claim 11 wherein the flow conduit is tubular.

13. The appliance of claim 12 wherein the flow conduit comprises stainless steel.

14. The appliance of claim 1 wherein part of said single heating element is bonded to a metal head plate to form a hot return.

15. The appliance of claim 1 wherein the flow conduit comprises an inlet arranged so as to introduce water into the flow conduit along a direction offset from a central axis of the flow conduit.

16. The appliance of claim 1 wherein the flow conduit is configured such that water traveling through the flow conduit swirls about a central axis of the flow conduit.

17. The appliance of claim 16, further comprising one or more mechanical features disposed in the flow conduit, which mechanical features are helically arranged in the flow conduit about a central axis of the flow conduit.

18. The appliance of claim 1 wherein the single heating element includes a sheathed heating element disposed in the flow conduit, and the appliance further comprises a mechanical feature wrapped around the sheathed heating element.

19. The appliance of claim 18 wherein the mechanical feature is configured to cause water traveling through the flow conduit to swirl about a central axis of the flow conduit.

20. The appliance of claim 1 comprising an arrangement for controlling an appliance exit water temperature.

21. The appliance of claim 20 wherein said arrangement for controlling the appliance exit water temperature includes an arrangement for altering a flow rate of water through the water flow heater.

22. The appliance of claim 1 arranged to delay the flow of water through the water flow heater for interval period of time after the at least one heating element is switched to the activated state.

23. The appliance of claim 1 arranged so that the single heating element switches to the deactivated state before the flow of water through the appliance is stopped.

24. The appliance of claim 1 arranged to dispense water for a time preset by a user.

25. The appliance of claim 24 wherein said preset time is set by means of a dispense volume control.

26. The appliance of claim 1 comprising a temperature sensor disposed in the flow conduit.

27. The appliance of claim 1 comprising an arrangement to permit automatic outflow of water from the final heating chamber upon the water therein reaching a predetermined level.

28. The appliance of claim 27 comprising a weir disposed within the final heating chamber in a configuration such that the flow of water escapes over the weir prior to exiting the final heating chamber when the water level in the final heating chamber exceeds the predetermined level.

* * * * *